US012575008B2

(12) United States Patent
Lee et al.

(10) Patent No.: US 12,575,008 B2
(45) Date of Patent: Mar. 10, 2026

(54) INDUCTION HEATING APPARATUS AND METHOD FOR CONTROLLING INDUCTION HEATING APPARATUS

(71) Applicant: LG ELECTRONICS INC., Seoul (KR)

(72) Inventors: Jung Youn Lee, Seoul (KR); Gwangrok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1032 days.

(21) Appl. No.: 17/668,001

(22) Filed: Feb. 9, 2022

(65) Prior Publication Data

US 2022/0256658 A1 Aug. 11, 2022

(30) Foreign Application Priority Data

Feb. 10, 2021 (KR) ......................... 10-2021-0019284

(51) Int. Cl.
H05B 6/06 (2006.01)
H02M 1/08 (2006.01)
(Continued)

(52) U.S. Cl.
CPC .............. H05B 6/065 (2013.01); H02M 1/08 (2013.01); H02M 7/53871 (2013.01);
(Continued)

(58) Field of Classification Search
CPC ...... H05B 6/065; H05B 6/1272; H05B 6/062; H05B 6/1209; H05B 2213/03;
(Continued)

(56) References Cited

U.S. PATENT DOCUMENTS

2009/0057298 A1* 3/2009 Komma ............... H05B 6/1209
307/104
2012/0061381 A1* 3/2012 Hashimoto ............ H05B 6/062
219/620

(Continued)

FOREIGN PATENT DOCUMENTS

JP 2007 012482 A 1/2007
KR 10-1997-0058342 7/1997
(Continued)

OTHER PUBLICATIONS

Extended European Search Report dated Jun. 29, 2022 issued in Application 22155950.3.
(Continued)

*Primary Examiner* — Jimmy Chou
*Assistant Examiner* — Thao Uyen Tran-Le
(74) *Attorney, Agent, or Firm* — KED & ASSOCIATES, LLP

(57) ABSTRACT

An induction heating apparatus may include a first working coil provided in a position corresponding to a first heating region, a second working coil provided in a position corresponding to a second heating region, an inverter circuit configured to supply current for driving at least one of the first working coil or the second working coil, and a drive circuit configured to supply a switching signal to each of the switching elements. A controller may be configured to determine a driving mode of the working coil when a heating start command for at least one of the first working coil or the second working coil is input, and the controller may provide a control signal for outputting the switching signals based on the determined driving mode.

18 Claims, 17 Drawing Sheets

(51) Int. Cl.
| | |
|---|---|
| *H02M 7/5387* | (2007.01) |
| *H05B 6/12* | (2006.01) |
| *H02M 1/34* | (2007.01) |
| *H02M 7/06* | (2006.01) |

(52) U.S. Cl.
CPC ............. *H05B 6/1272* (2013.01); *H02M 1/34* (2013.01); *H02M 7/06* (2013.01)

(58) Field of Classification Search
CPC ...... H02M 1/08; H02M 7/53871; H02M 1/34; H02M 7/06; H02M 7/44
See application file for complete search history.

(56) References Cited

U.S. PATENT DOCUMENTS

| | | | |
|---|---|---|---|
| 2014/0144902 A1* | 5/2014 | Oh ......................... | H05B 6/065 |
| | | | 219/662 |
| 2016/0100461 A1* | 4/2016 | Park ..................... | H05B 6/1272 |
| | | | 219/662 |

| | | | |
|---|---|---|---|
| 2018/0062443 A1* | 3/2018 | Cho ................... | H02M 7/53871 |
| 2018/0301934 A1* | 10/2018 | Prabhala ............. | H02J 7/00714 |
| 2019/0032922 A1* | 1/2019 | Yoshino ................... | H02J 50/12 |
| 2019/0254125 A1* | 8/2019 | Milanesi ............... | H05B 6/065 |
| 2020/0021136 A1* | 1/2020 | Suga ........................ | H02J 50/12 |
| 2023/0238825 A1* | 7/2023 | Zhou ..................... | H02J 50/005 |
| | | | 307/104 |

FOREIGN PATENT DOCUMENTS

| | | | |
|---|---|---|---|
| KR | 10-1997-0058362 | | 7/1997 |
| KR | 10-1997-0061008 | | 8/1997 |
| KR | 100 204 2431 B1 | | 6/1999 |
| KR | 100204243 B1 * | | 6/1999 |
| KR | 10-2014-0067328 | | 6/2014 |
| KR | 10-2201189 | | 1/2021 |

OTHER PUBLICATIONS

Korean Office Action dated Mar. 19, 2025 issued in Application No. 10-2021-0019284.

* cited by examiner

INDUCTION HEATING APPARATUS AND METHOD FOR CONTROLLING INDUCTION HEATING APPARATUS

CROSS-REFERENCE TO RELATED APPLICATION

This application claims priority under 35 U.S.C. § 119 to Korean Application No. 10-2021-0019284, filed Feb. 10, 2021, whose entire subject matter is hereby incorporated by reference.

BACKGROUND

1. Field

The present disclosure relates to an induction heating apparatus and a method for controlling the induction heating apparatus.

2. Background

An induction heating apparatus is a device that heats a container by generating an eddy current in a metal container, using a magnetic field generated around a working coil. When the induction heating apparatus is driven, an alternating current may be applied to the working coil. Accordingly, an induction magnetic field may be generated around the working coil disposed in the induction heating apparatus. When a magnetic force line of the induced magnetic field generated in this way passes through the bottom of the container having a metal component placed on the working coil, an eddy current may be generated inside the bottom of the container. When the eddy current generated in this way flows through the container, the container itself may be heated.

The induction heating apparatus includes an inverter circuit supplying current for driving a working coil. The inverter circuit includes a plurality of switching elements that are alternately turned on and off with each other. The inverter circuit may be divided into a half-bridge inverter circuit including two switching elements and a full-bridge inverter circuit including four switching elements.

FIG. 1 is a circuit diagram of an induction heating apparatus including a full-bridge inverter circuit.

Referring to FIG. 1, the induction heating apparatus 7 includes two working coils 712 and 714 (i.e., a first working coil 712 and a second working coil 714). The first working coil 712 and the second working coil 714 may be provided in respective positions corresponding to a first heating region (or first heating area) and a second heating region (or second heating area).

The induction heating apparatus 7 includes a rectifier circuit 702, a smoothing circuit 704, a first inverter circuit 706 and a second inverter circuit 708.

The rectifier circuit 702 may include a plurality of diodes. The smoothing circuit 704 may include a first inductor L1 and a first DC link capacitor C1.

The first inverter circuit 706 may be a full-bridge inverter circuit including four switching elements SW1, SW2, SW3 and SW4. The second inverter circuit 708 may be a full-bridge inverter circuit including four switching elements SW5, SW6, SW7 and SW8.

When the switching elements S1 to S8 are supplied based on the control of a controller, the first inverter circuit 706 and the second inverter circuit 708 may receive current through the rectifier circuit 702 and the smoothing circuit 704, respectively, and then convert the input currents to supply the converted currents to the first working coil 712 and the second working coil 714, respectively.

According to the apparatus shown in FIG. 1, since two inverter circuits supplying currents to two working coils are configured as the full-bridge circuits, a total of eight switching elements SW1 to SW8 must be provided inside the induction heating apparatus. However, as the number of the switching elements provided in the induction heating apparatuses increases, there is a disadvantage in that the circuit design difficulty and manufacturing cost of the induction heating apparatus increase.

BRIEF DESCRIPTION OF THE DRAWINGS

The embodiments will be described in detail with reference to the following drawings in which like reference numerals refer to like elements and wherein:

FIG. 3 shows a configuration of the induction heating apparatus according to one embodiment;

FIGS. 14 and 15 show a current path by charging or discharging snubber capacitors of the switching elements provided on a second arm circuit, when only the first working coil is driven in the full-bridge mode and the second working coil is not driven according to the FIG. 12 embodiment;

DETAILED DESCRIPTION

Figure 1:
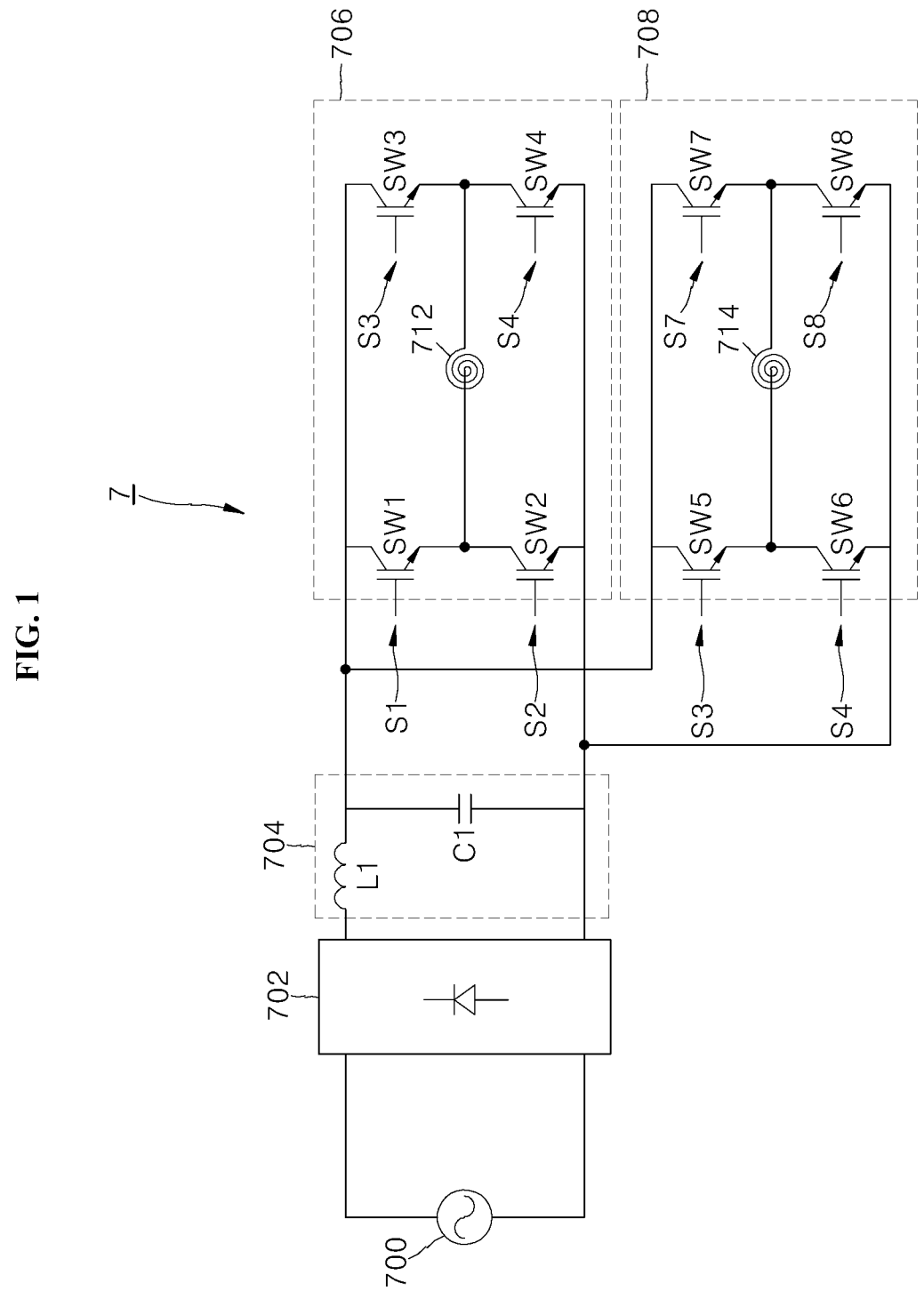
FIG. 1 is a circuit view of an induction heating apparatus.

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

Figure 2:
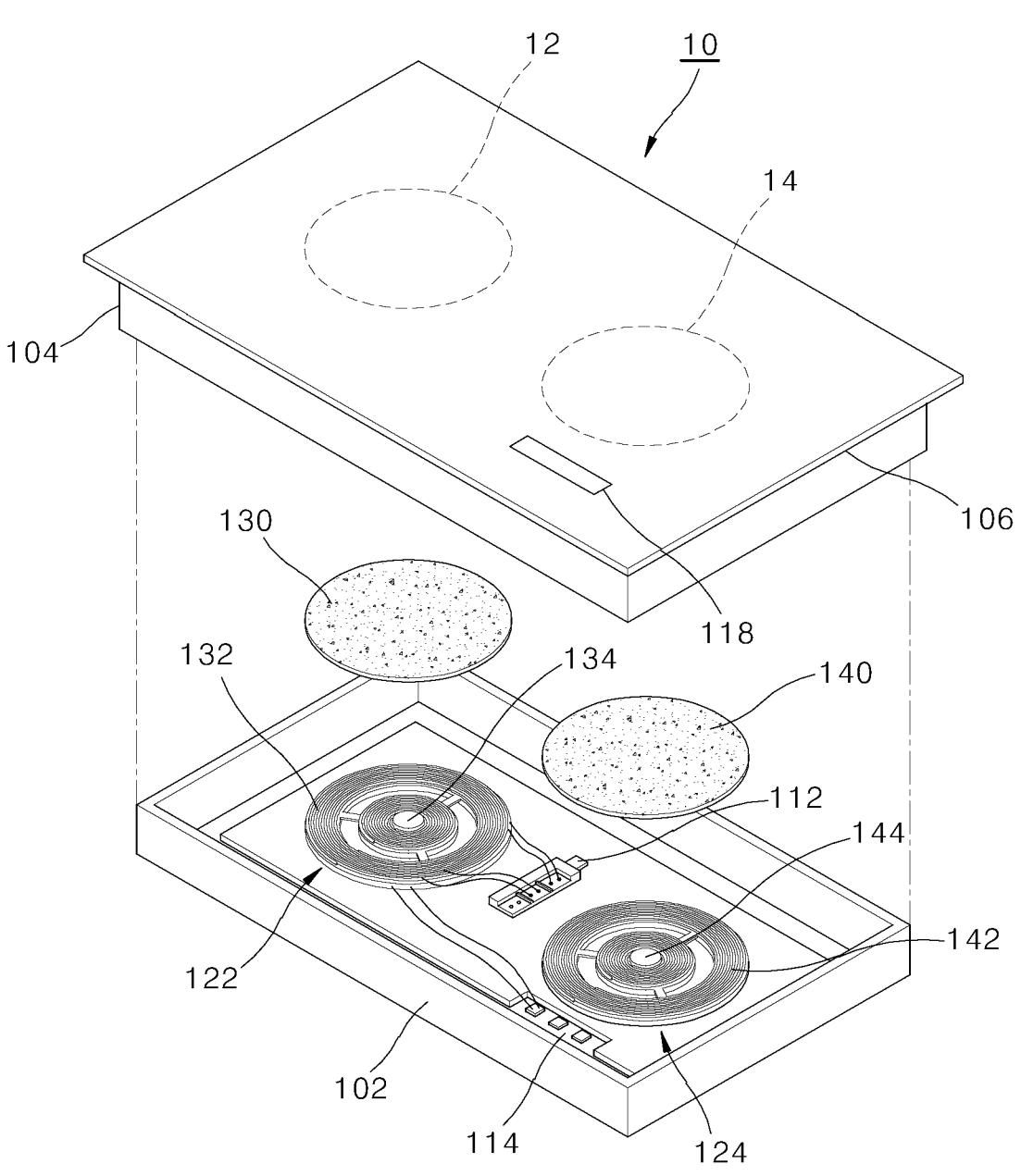
FIG. 2 is an exploded perspective view of an induction heating apparatus according to one embodiment of the present disclosure.

FIG. 2 is an exploded perspective view of an induction heating apparatus according to one embodiment of the present disclosure. The induction heating apparatus according to one embodiment of the present disclosure may include the induction heating apparatus 10 which includes a case 102 defining a main body, and a cover plate 104 coupled to the case 102 and seals the case 102.

The cover plate 104 may be coupled to an upper surface of the case 102 to close the space formed in the case 102 from the outside. The cover plate 104 may include a top plate 106 on which an object to be heated (i.e., a container for cooking food) is placed. The top plate 106 may be made of a tempered glass material such as ceramic glass, but is not limited thereto. The material of the top plate 106 may vary according to embodiments.

Heating regions 12 and 14 (or heating areas) corresponding to working coil assemblies 122 and 124, respectively, may be formed in (or on) the top plate 106. Lines or figures corresponding to the heating regions 12 and 14 may be printed or displayed on the top plate 106 in order for a user to clearly recognize the positions of the heating regions 12 and 14.

The case 102 may have a hexahedral shape with an open top. The working coil assembly 122 and 124 for heating a container (or vessel) may be disposed in the space formed inside the case 102. In addition, an interface unit 114 (or interface) may be provided inside the case 102 and have functions to adjust a power level of each heating region 12 and 14, and display related information to the induction heating apparatus 10. The interface unit 114 may be a touch panel that is capable of both inputting information and displaying information by touch, but the interface unit 114 having a different structure may be provided according to embodiments. The interface unit 114 may have control buttons and separate display unit, which may be arranged at different locations of the case.

A manipulation region 118 may be formed at the top plate 106 in a position corresponding to the interface unit 114. For user manipulation, characters or images may be printed on the manipulation region 118. The user may perform a desired operation by touching a specific point of the manipulation region 118 with reference to the characters or images pre-printed on the manipulation region 118.

The user may set the power level of each heating region 12 and 14 through the interface 114. The power level may be indicated by a number (e.g., 1, 2, 3, . . . , 9) on the manipulation region 118. When the power level for each heating region 12 and 14 is set, the required power value and the heating frequency of the working coil assemblies responding to the respective heating regions 12 and 14 may be determined. A controller may drive each working coil so that the actual output power value can match the required power value set by the user based on the determined heating frequency.

A power source part 112 for supplying power to the working coil assemblies 122 and 124 or the interface unit 114 may be provided in the space formed inside the case 102.

In the embodiment of FIG. 2, two working coil assemblies (i.e., a first working coil assembly 122 and a second working coil assembly 124) are disposed inside the case 102. However, three or more working coil assemblies may be provided in the case 102 according to embodiments.

Each working coil assembly 122 and 124 may include a working coil configured to an induced magnetic field using a high frequency alternating current supplied by the power source part 112, and an insulating sheet configured to protect the coil from heat generated by the container. For example, the first working assembly 122 (shown in FIG. 2) may include a first working coil 132 for heating the container put in the first heating region 12 and a first insulating sheet 130. The second working assembly 124 may include a second working coil 142 and a second insulating sheet 140. The insulating sheet may not be provided according to embodiments.

A temperature sensor may be provided at the center of each working coil. For example, the temperature sensor 134, 144 may be provided in the center of the first and second working coil 132, 142, respectively, as shown in FIG. 2. The temperature sensor may measure the temperature of the container put in each heating region. In one embodiment, the temperature sensor may be a thermistor temperature sensor having a variable resistance of which a resistance value changes according to the temperature of the container, but is not limited thereto.

In the embodiment, the temperature sensor may output a sensing voltage corresponding to the temperature of the container and the sensing voltage output from the temperature sensor may be transmitted to the controller. The controller may check the temperature of the container based on the magnitude of the sensing voltage output from the temperature sensor. When the temperature of the container is a preset reference value or more, the controller may perform an overheat protection operation of lowering the actual power value of the working coil or stopping the driving of the working coil.

Although not shown in FIG. 2, a circuit board on which a plurality of circuits or elements including the controller may be disposed in the space formed inside the case 102.

The controller may perform a heating operation by driving each working coil based on the user's heating start command input through the interface unit 114. When the user inputs a heating terminating command through the interface unit 114, the controller may stop the driving of the working coil to terminate the heating operation.

FIG. 43 is a circuit diagram of an induction heating apparatus according to one embodiment. The induction heating apparatus 10 may include a rectifier circuit 202, a smoothing circuit 203, an inverter circuit 204 (or inverter), a first working coil 132, a second working coil 142, a controller 2 and a drive circuit 22.

Figure 3:
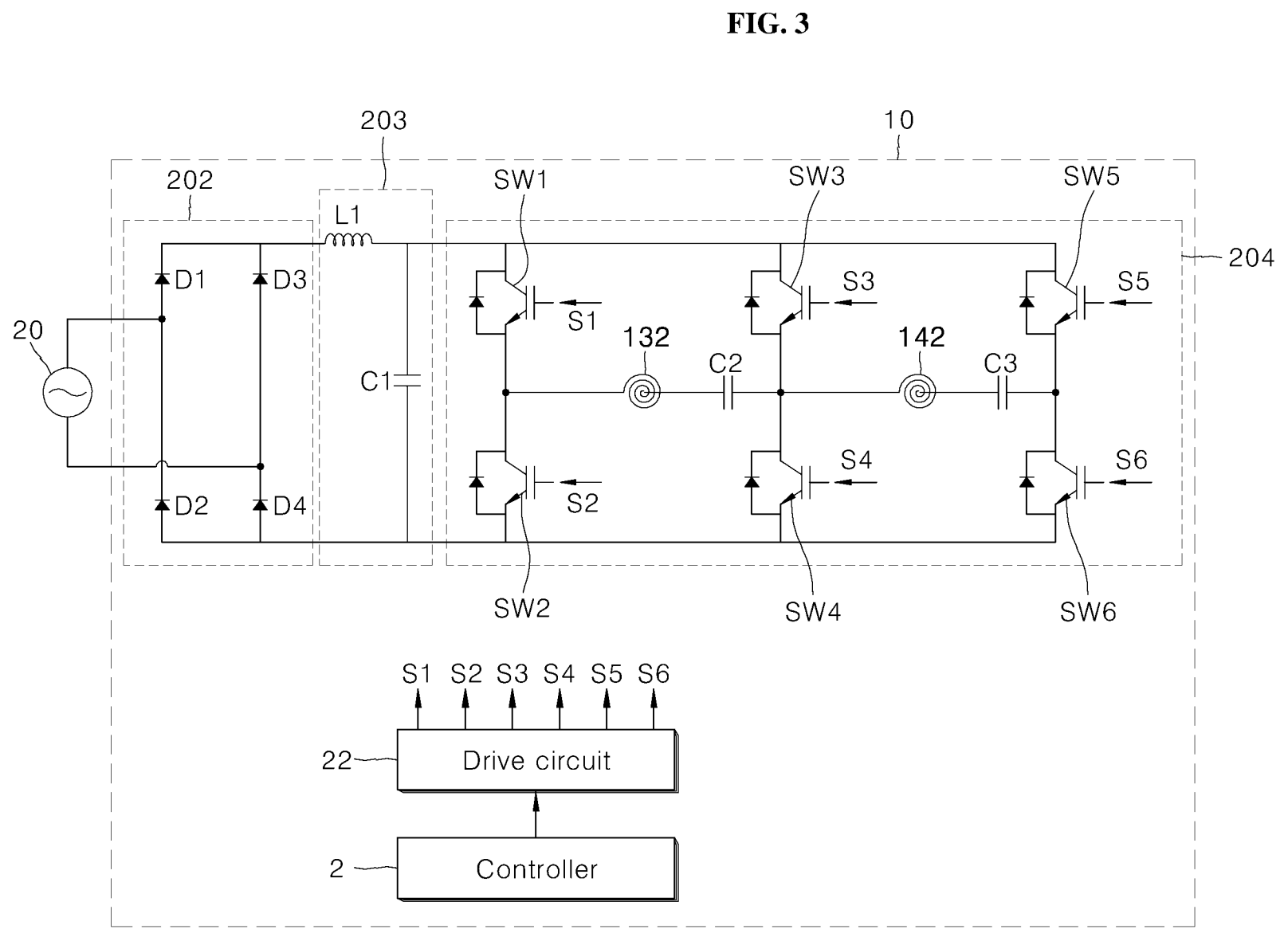

The rectifier circuit 202 may include a plurality of diodes D1, D2, D3 and D4. As shown in FIG. 3, the rectifier circuit 202 may be a bridge diode circuit and it may be another type circuit according to embodiments. The rectifier circuit 202 may be configured to rectify the AC input voltage supplied from the power source 20, thereby outputting a voltage having a pulsating waveform.

The smoothing circuit 203 may smooth the voltage rectified by the rectifier circuit 202 and output a DC link voltage. The smoothing circuit 203 may include a first inductor L1 and a DC link capacitor C1.

The inverter circuit 204 may convert the current output from the smoothing circuit 204 and supply the converted current to each of the first and second working coils 132 and 142.

The inverter circuit 204 may include a first switching element SW1, a second switching element SW2, a third switching element SW3, a fourth switching element SW4, a fifth switching element SW5 and a sixth switching element SW6.

The first switching element SW1 and the second switching element SW2 may be connected in series with each other. The third switching element SW3 and the fourth switching element SW4 may be connected in series with each other. The fifth switching element SW5 and the sixth switching element SW6 may be also connected in series with each other.

The third switching element SW3 and the fourth switching element SW4 may be connected in parallel with the first switching element SW1 and the second switching element SW2. The fifth switching element SW5 and the sixth switching element SW6 may be connected in parallel with the third switching element SW3 and the fourth switching element SW4.

The first working coil 132 may be connected between a connection point of the first and second switching elements SW1 and SW2 and a connection point of the third and fourth switching elements SW3 and SW4. The second working coil 142 may be connected between the connection point of the third and fourth switching elements SW3 and SW4 and a connection point of the fifth and sixth switching elements SW5 and SW6.

As shown in FIG. 3, the third switching element SW3 and the fourth switching element SW4 provided in the inverter circuit 204 may be connected with not only the first working coil 132 but also the second working coil 142. In other words, the first working coil 132 and the second working coil 142 may share the third switching element SW3 and the fourth switching element SW3.

In the present disclosure, the first switching element SW1 and the second switching element SW2 may be referred to as a first arm circuit. The fifth switching element SW5 and the sixth switching element SW6 may be referred to as a second arm circuit. In addition, the third switching element SW3 and the fourth switching element SW4 may be referred to as a shared arm circuit. In other words, the first arm circuit may include the first switching element SW1 and the second switching element SW2. The second arm circuit may include the fifth switching element SW5 and the sixth switching element SW6. The shared arm circuit may include the third switching element SW3 and the fourth switching element SW4.

In one embodiment of the present disclosure, the first switching element SW1 and the second switching element SW2 may be alternately turned on and off. The third switching element SW3 and the fourth switching element SW4 may be alternately turned on and off. The fifth switching element SW5 and the sixth switching element SW6 may be alternately turned on and off.

The DC link voltage input to the inverter circuit 204 may be converted into an AC current by the turn-on and turn-off operations of the switching elements SW1, SW2, SW3, SW4, SW5 and SW6 (i.e., the switching operation). The alternating current converted by the inverter circuit 204 may be supplied to each of the first working coil 132 and the second working coil 142. When the alternating current is supplied, resonance is likely to occur in the first working coil 132 and/or the second working coil 142 while an eddy current flows into the container to heat the container.

The controller 2 may output a control signal for controlling the drive circuit 22. The drive circuit 22 may supply switching signals S1, S2, S3, S4, S5 and S6 to the switching elements SW1, SW2, SW3, SW4, SW5 and SW6 provided in the inverter circuit 204 based on the control signal supplied by the controller 2, respectively. The first switching signal S1, the second switching signal S2, the third switching signal S3, the fourth switching signal S4, the fifth switching signal S5 and the sixth switching signal S6 may be PWM (Pulse Width Modulation) signals having a predetermined duty cycle.

When the alternating current output from the inverter circuit 204 is supplied to the working coils 132 and 142, the working coils 132 and 142 may be driven. When the working coils 132 and 142 are driven, the eddy current may flow into the container put on (or provided on) each working coil 132 and 142 to heat the container. When the working coils 132 and 142 are driven, the amount of thermal energy supplied to the container may vary according to the amount of power actually generated by the driving of the working coils (i.e., the actual output power value of the working coil).

When the user changes a current state of the induction heating apparatus 10 into a power on state through a manipulation region 118, the input power source may supply power to the induction heating apparatus 10, and the induction heating apparatus may enter a driving standby state. The user may put a container on the first heating region 12 (or first heating area) and/or the second heating region 14 (or second heating area), and set a power level for the first heating region 12 and/or the second heating region 14 to input a heating start command. Once the user inputs the heating start command, the controller may determine a power value required for each working coil 132 and 142 (i.e., a required power value corresponding to the power level set by the user).

The controller 2 having received the heating start command may determine a frequency corresponding to the required power value of the working coil 132 and 142 (i.e., a heating frequency), and supply a control signal corresponding to the determined heating frequency to the drive circuit 22. Accordingly, switching signals S1, S2, S3, S4, S5 and S6 may be output from the drive circuit 22. As the switching signals S1, S2, S3, S4, S5 and S6 are input to the switching elements SW1, SW2, SW3, SW4, SW5 and SW6, respectively, the working coils 132 and 142 may be driven. Once the working coils 132 142 are driven, the eddy current may flow through the container, and the container may then be heated.

In an embodiment of the present disclosure, the controller 2 may determine a heating frequency corresponding to the power level set for the heating region. For example, when the user sets a power level for the heating region, the controller 2 may gradually lower the driving frequency of the inverter circuit 204 until the output power value of the working coils 132 and 142 (in a state where the driving frequency of the inverter circuit 204 is set to a predetermined reference frequency) matches the required power value corresponding to the power level set by the user. The controller 2 may determine a frequency detected when the output power value of the working coils 132 and 142 matches the required power value as the heating frequency.

The controller 2 may supply a control signal corresponding to the determined heating frequency to the drive circuit 22. The drive circuit 22 may output switching signals S1, S2, S3, S4, S5 and S6 having a duty ratio corresponding to the heating frequency determined by the controller 2 based on the control signal output from the controller 2. While the switching elements SW1, SW2, SW3, SW4, SW5 and SW6 are turned on and off complementary to each other in response to the input of the switching signals S1, S2, S3, S4, S5 and S6, the alternating current may be supplied to the working coils 132 and 142. Accordingly, the container provided on (or put in) the heating region 14 may be heated.

In one embodiment of the present disclosure, the controller 2 may control the driving of the first working coil 132 and/or the second working coil 142 based on the power level set for the heating regions 12 and 14. Embodiments may be described in which the controller 2 may control the driving of the first working coil 132 and/or the second working coil 142 based on the power level set for the heating regions 12 and 14.

When the user inputs the power level for the first heating region 12 and/or the second heating region 14 and inputs the heating start command, the controller 2 may determine the required power value of the first working coil 132 and/or the second working coil 142 corresponding to the power level set by the user. As one example, when the power level of the first heating region 12 is 2, the required power value of the first working coil 132 may be determined to be 600 W. As another example, when the power level of the second heating region 14 is 9, the required power value of the second working coil 142 may be determined to be 3000 W.

The user may set the power level only for the first heating region 12 to input the heating start command. In this example, only the first working coil 132 may be driven and the second working coil 142 may not be driven.

Alternatively, the user may set the power level only for the second heating region 14 to input the heating start command. In this example, the first working coil 132 may not be driven and only the second working coil 142 may be driven.

The user may set the power level for each of the first and second heating regions 12 and 14 to input the start command for each first and second heating region 12 and 14. In this example, the first working coil 132 and the second working coil 142 may be driven.

In one embodiment of the present disclosure, the controller 2 may determine the driving mode of each working coil 132 and 142 based on the required power value of each working coil 132 and 142 corresponding to the power level set for each heating region 12 and 14.

In one embodiment of the present disclosure, the controller 2 may determine the driving mode of each working coil to be driven in the half-bridge mode, when the required power value is equal to or less than a preset reference power value (e.g., 600 W). In one embodiment, the controller 2 may determine the driving mode of the working coil, which will be driven, in the full-bridge mode, when the required power value exceeds the preset reference power value. At this time, the reference power value may be a value set differently according to embodiments.

In the half-bridge mode, the inverter circuit 204 may be driven as a half-bridge circuit in which two switching elements are alternately turned on and off with each other. In the full-bridge mode, the inverter circuit 204 may be driven as a full-bridge circuit in which two pairs of switching elements (i.e., four switching elements) are alternately turned on and off with each other.

Figure 4:
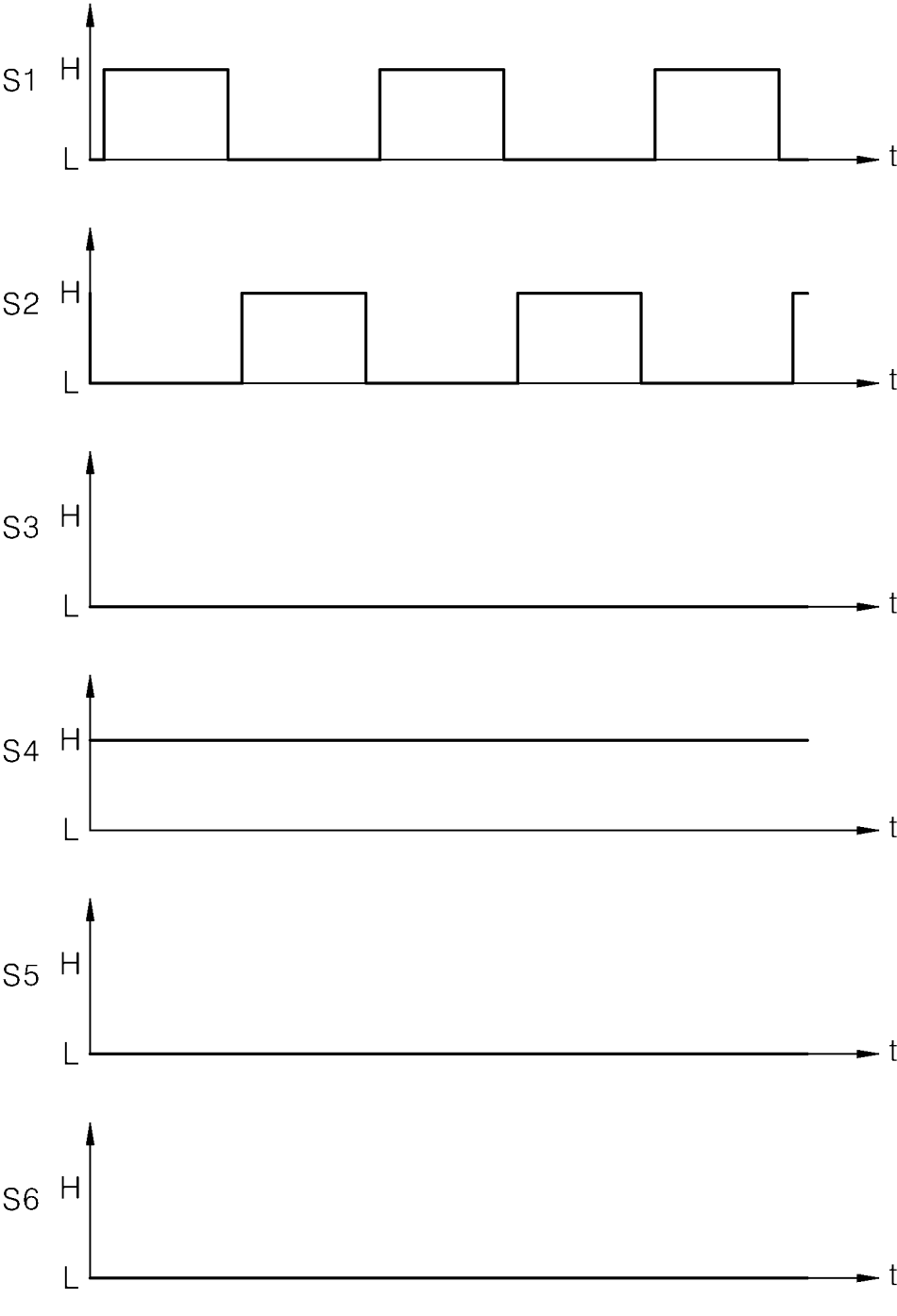
FIG. 4 shows a waveform of a switching signal input to an inverter circuit when only the first working coil is driven in a half-bridge mode.

FIG. 4 shows a waveform of a switching signal input to an inverter circuit when only the first working coil is driven in a half-bridge mode.

If only the heating start command for the first heating region 12 is input and the required power value corresponding to the power level of the first heating region 12 is less than or equal to a predetermined reference power value (e.g., 600 W), the controller may determine the driving mode of the first working coil 132 to be the half-bridge mode. Accordingly, the controller 2 may supply a control signal to the driving circuit 22 so that the switching signals S1, S2, S3, S4, S5 and S6 having the waveforms shown in FIG. 4 may be output.

Referring to FIG. 4, when the driving mode of the first working coil 132 is the half-bridge mode, the first switching element SW1 may be alternately turned on and off with the second switching element SW2. The fourth switching element SW4 may be maintained in the turned-on state, and the third switching element SW3, the fifth switching element SW5 and the sixth switching element SW6 may be maintained in the turned-off state. Accordingly, only the first working coil 132 may be driven in the half-bridge mode but the second working coil 142 may not be driven.

Figure 5:
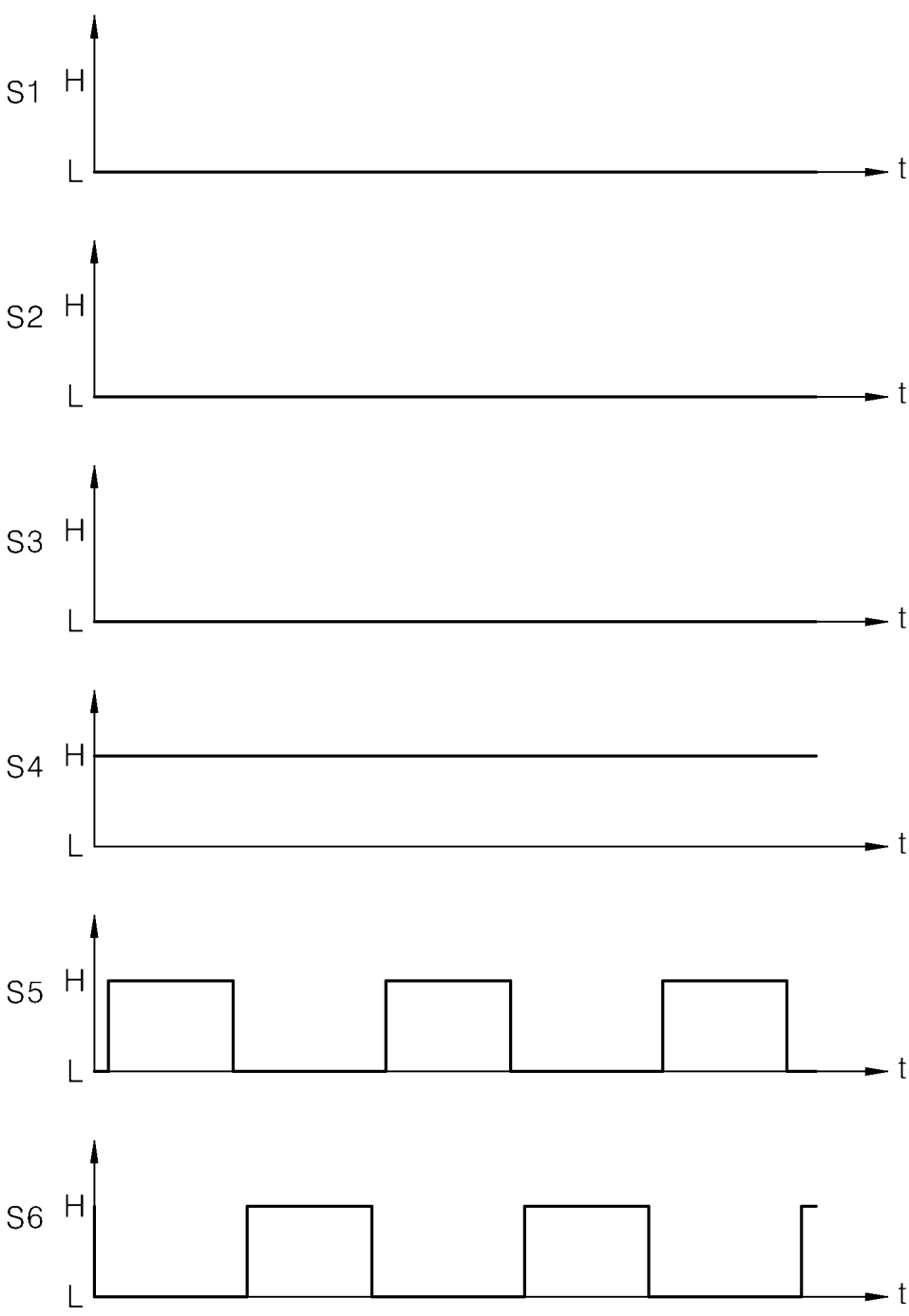
FIG. 5 shows a waveform of a switching signal input to the inverter circuit when only the second working coil is driven in a half-bridge mode.

FIG. 5 shows a waveform of a switching signal input to the inverter circuit when only the second working coil is driven in a half-bridge mode.

If only the heating start command for the second heating region 14 is input and the required power value corresponding to the power level of the second heating region 14 is less than or equal to a predetermined reference power value (e.g., 600 W), the controller 2 may determine the driving mode of the second working coil 142 to be the half-bridge mode. Accordingly, the controller 2 may supply a control signal to the driving circuit 22 so that the switching signals S1, S2, S3, S4, S5 and S6 having the waveforms shown in FIG. 5 may be output.

Referring to FIG. 5, when the driving mode of the second working coil 142 is the half-bridge mode, the fifth switching element SW5 may be alternately turned on and off with the sixth switching element SW6. The fourth switching element SW4 may be maintained in the turned-on state, and the first switching element SW1, the second switching element SW2 and the third switching element SW3 may be maintained in the turned-off state. Accordingly, only the second working coil 142 may be driven in the half-bridge mode but the first working coil 132 may not be driven.

Figure 6:
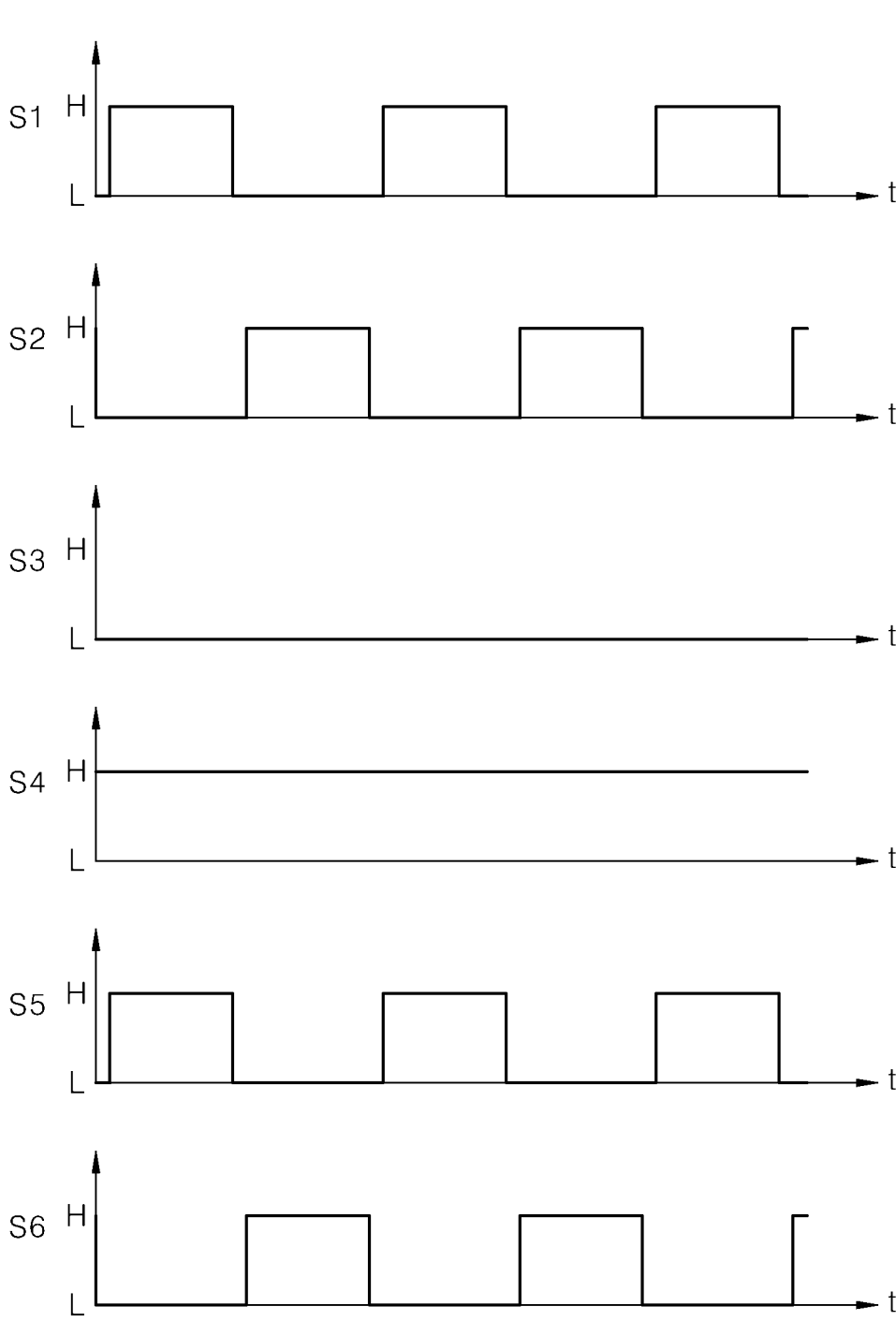
FIG. 6 shows a waveform of a switching signal input to the inverter circuit when both the first working coil and the second working coil are driven in the half-bridge mode.

FIG. 6 shows a waveform of a switching signal input to the inverter circuit when both the first working coil and the second working coil are driven in the half-bridge mode.

If the heating start command for the first heating region 12 and the heating start command for the second heating region 14 are input and the required power value corresponding to the power level of the first heating region 12 and the required power value corresponding to the power level of the second heating region 14 are less than or equal to a predetermined reference power value (e.g., 600 W), the controller 2 may determine the driving mode of the first working coil 132 and the driving mode of the second working coil 142 to be the half-bridge mode. Accordingly, the controller 2 may supply a control signal to the driving circuit 22 so that the switching signals S1, S2, S3, S4, S5 and S6 having the waveforms shown in FIG. 6 may be output.

Referring to FIG. 6, when the driving mode of each of the first working coil 132 and the driving mode of the second working coil 142 are the half-bridge mode, the first switching element SW1 may be alternately turned on and off with the second switching element SW2, and the fifth switching element SW5 may be alternately turned on and off with the sixth switching element SW6. The fourth switching element SW4 may be maintained in the turned-on state, and the third switching element SW3 may be maintained in the turned-off state. Accordingly, each of the first working coil 132 and the second working coil 142 may be driven in the half-bridge mode.

Figure 7:
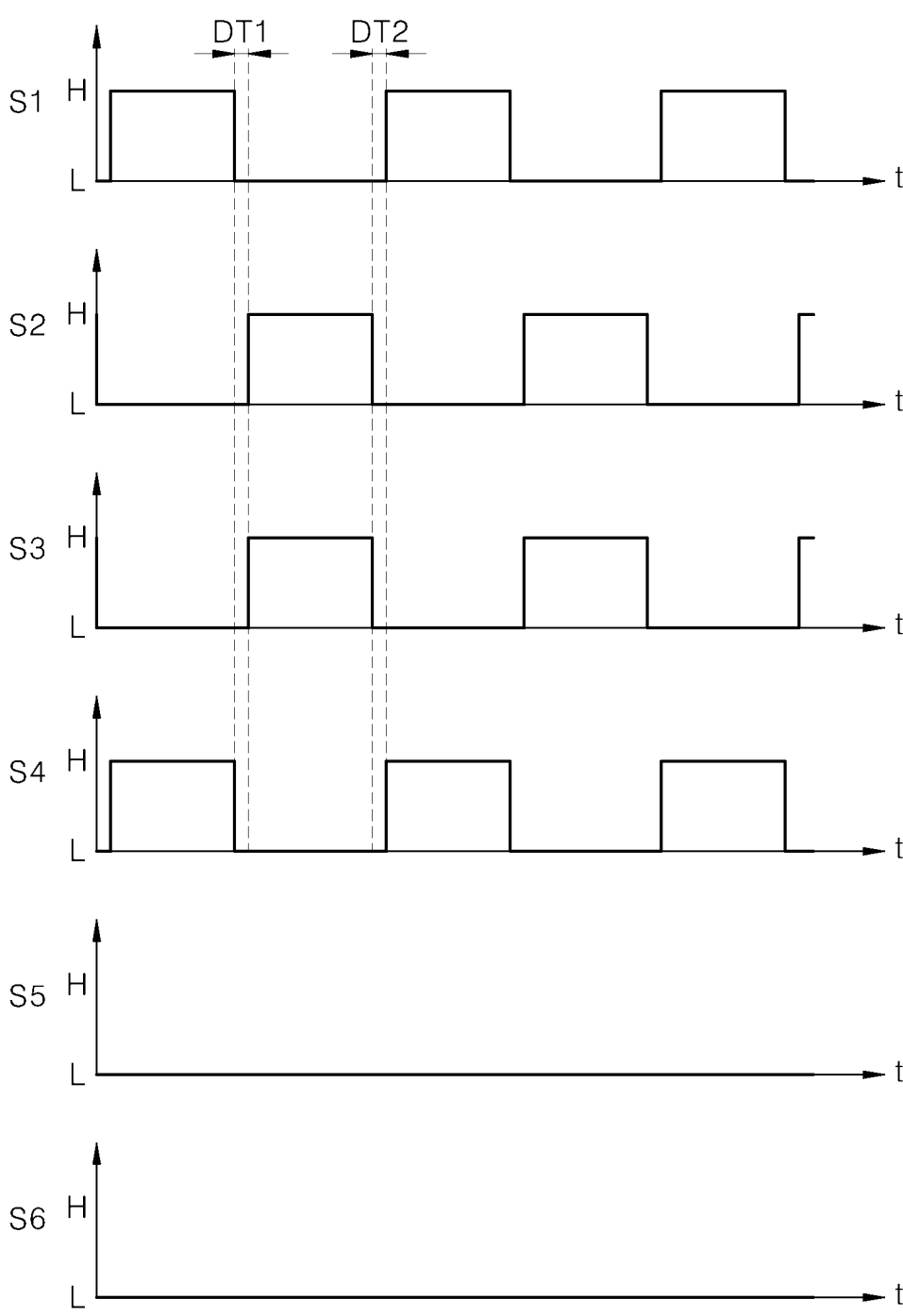
FIG. 7 shows a waveform of a switching signal input to the inverter circuit when only the first working coil is driven in the full-bridge mode.

FIG. 7 shows a waveform of a switching signal input to the inverter circuit when only the first working coil is driven in the full-bridge mode.

If only the heating start command for the first heating region 12 is input and the required power value corresponding to the power level of the first heating region 12 exceeds a predetermined reference power value (e.g., 600 W), the controller may change the driving mode of the first working coil 132 into the full-bridge mode. Accordingly, the controller 2 may supply a control signal to the driving circuit 22 so that the switching signals S1, S2, S3, S4, S5 and S6 having the waveforms shown in FIG. 7 may be output.

Referring to FIG. 7, when the driving mode of the first working coil 132 is the full-bridge mode, the first switching element SW1 may be alternately turned on and off with the second switching element SW2 and the third switching element SW3 may be alternately turned on and off with the fourth switching element SW4. The first switching element SW1 and the fourth switching element SW4 may be turned on and turned off at the same timing. The second switching element SW2 and the third switching element SW3 may be turned on and turned off at the same timing. In addition, the fifth switching element SW5 and the sixth switching element SW6 may be maintained in the turned-off state. Accordingly, only the first working coil 132 may be driven in the full-bridge mode while the second working coil 142 is not driven.

Figure 8:
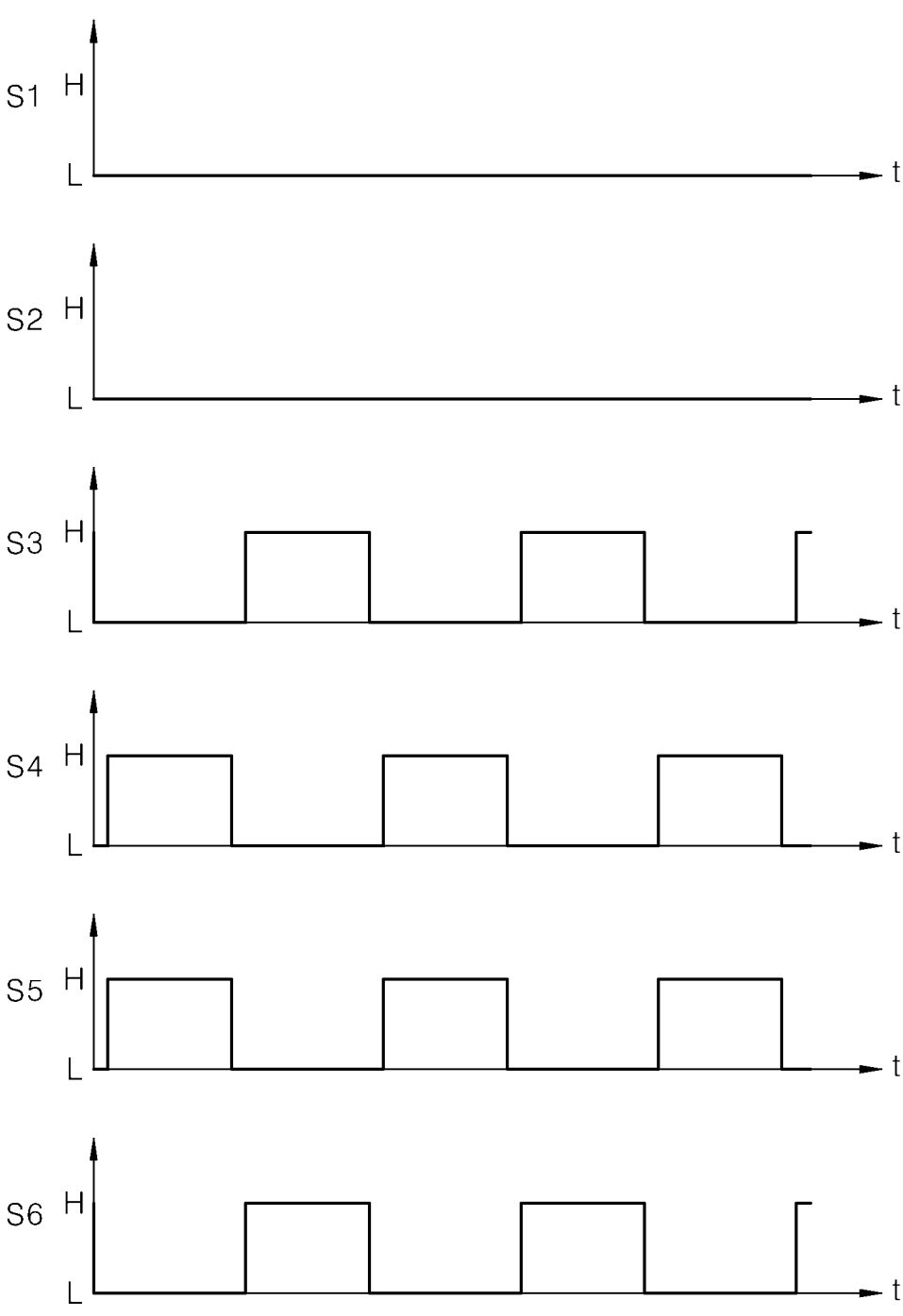
FIG. 8 shows a waveform of a switching signal input to the inverter circuit when only the second working coil is driven in the full-bridge mode.

FIG. 8 shows a waveform of a switching signal input to the inverter circuit when only the second working coil is driven in the full-bridge mode.

If only the heating start command for the second heating region 14 is input and the required power value corresponding to the power level of the first heating region 12 exceeds a predetermined reference power value (e.g., 600 W), the controller 2 may determine the driving mode of the second working coil 142 to be the full-bridge mode. Accordingly, the controller 2 may supply a control signal to the driving circuit 22 so that the switching signals S1, S2, S3, S4, S5 and S6 having the waveforms shown in FIG. 8 may be output.

Referring to FIG. 8, when the driving mode of the second working coil 142 is the full-bridge mode, the fifth switching element SW5 may be alternately turned on and off with the sixth switching element SW6, and the third switching element SW3 may be alternately turned on and off with the fourth switching element SW4. The third switching element SW3 and the sixth switching element SW6 may be turned on and turned off at the same timing. The fourth switching element SW4 and the fifth switching element SW5 may be turned on and turned off at the same timing. In addition, the first switching element SW1 and the second switching element SW2 may be maintained in the turned-off state. Accordingly, only the second working coil 142 may be driven in the full-bridge mode while the first working coil 132 is not driven.

Figure 9:
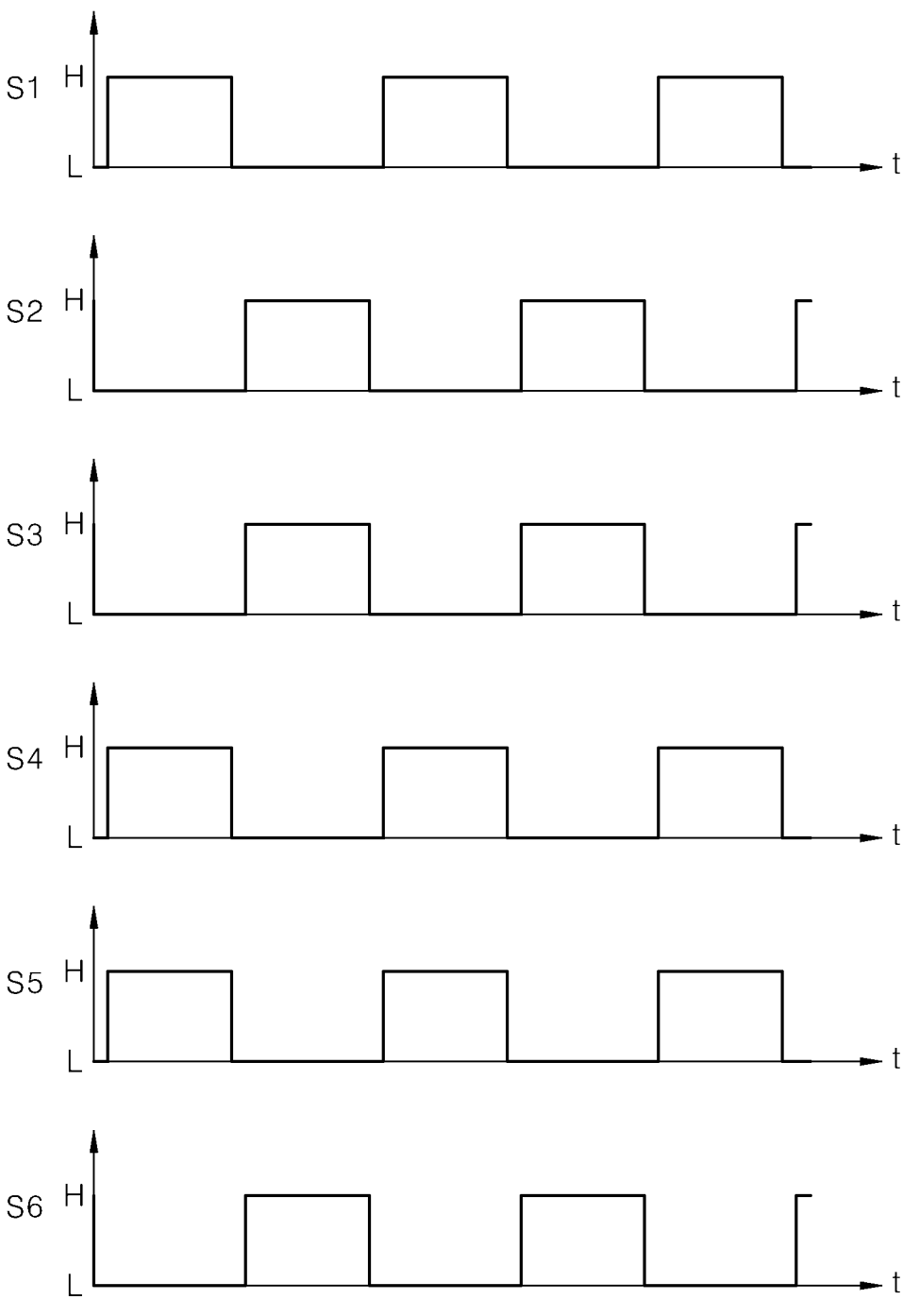
FIG. 9 shows a waveform of a switching signal input to the inverter circuit when both the first working coil and the second working coil are driven in the full-bridge mode.

FIG. 9 shows a waveform of a switching signal input to the inverter circuit when both the first working coil and the second working coil are driven in the full-bridge mode.

If the heating start command for the first heating region 12 and the heating start command for the second heating region 14 are input and the required power value corresponding to the power level of the first heating region 12 and the required power value corresponding to the power level of the second heating region 14 exceed a predetermined reference power value (e.g., 600 W), the controller 2 may determine the driving mode of the first working coil 132 and the driving mode of the second working coil 142 to be the full-bridge mode. Accordingly, the controller 2 may supply a control signal to the driving circuit 22 so that the switching signals S1, S2, S3, S4, S5 and S6 having the waveforms shown in FIG. 9 may be output.

Referring to FIG. 9, when the driving mode of each of the first working coil 132 and the driving mode of the second working coil 142 are the full-bridge mode, the first switching element SW1 may be alternately turned on and off with the second switching element SW2, and the third switching element SW3 may be alternately turned on and off with the fourth switching element SW4, and also the fifth switching element SW5 may be alternately turned on and off with the sixth switching element SW6. The first switching element SW1, the fourth switching element SW4 and the fifth switching element SW5 may be turned on and turned off at the same timing. The second switching element SW2, the third switching element SW3 and the fifth switching element SW5 may be turned on and turned off at the same timing. Accordingly, each of the first working coil 132 and the second working coil 142 may be driven in the full-bridge mode.

Figure 10:
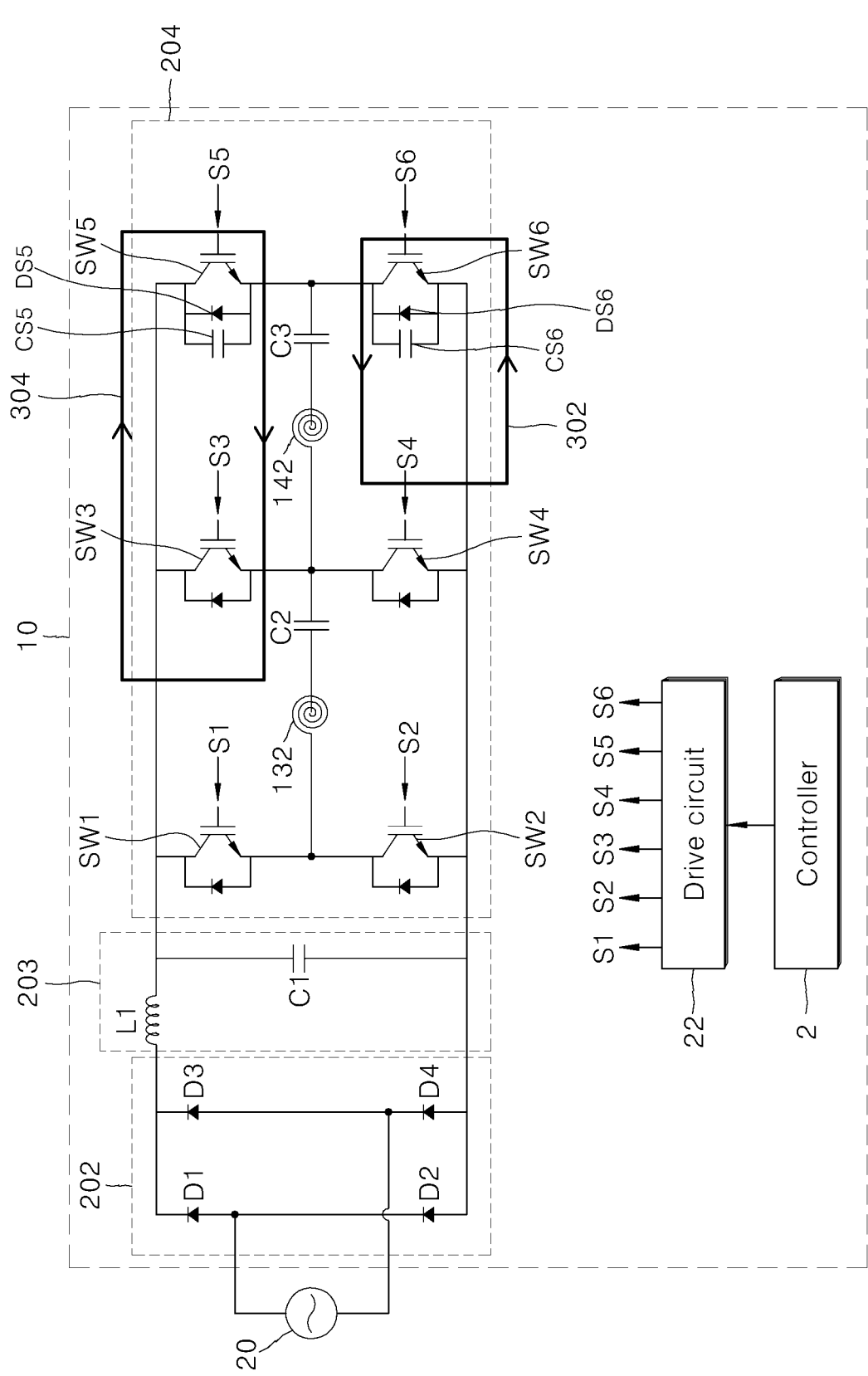
FIGS. 10 and 11 show a current path by charging or discharging snubber capacitors of the switching elements provided on a second arm circuit, when only the first working coil is driven in the full-bridge mode and the second working coil is not driven.
Figure 11:
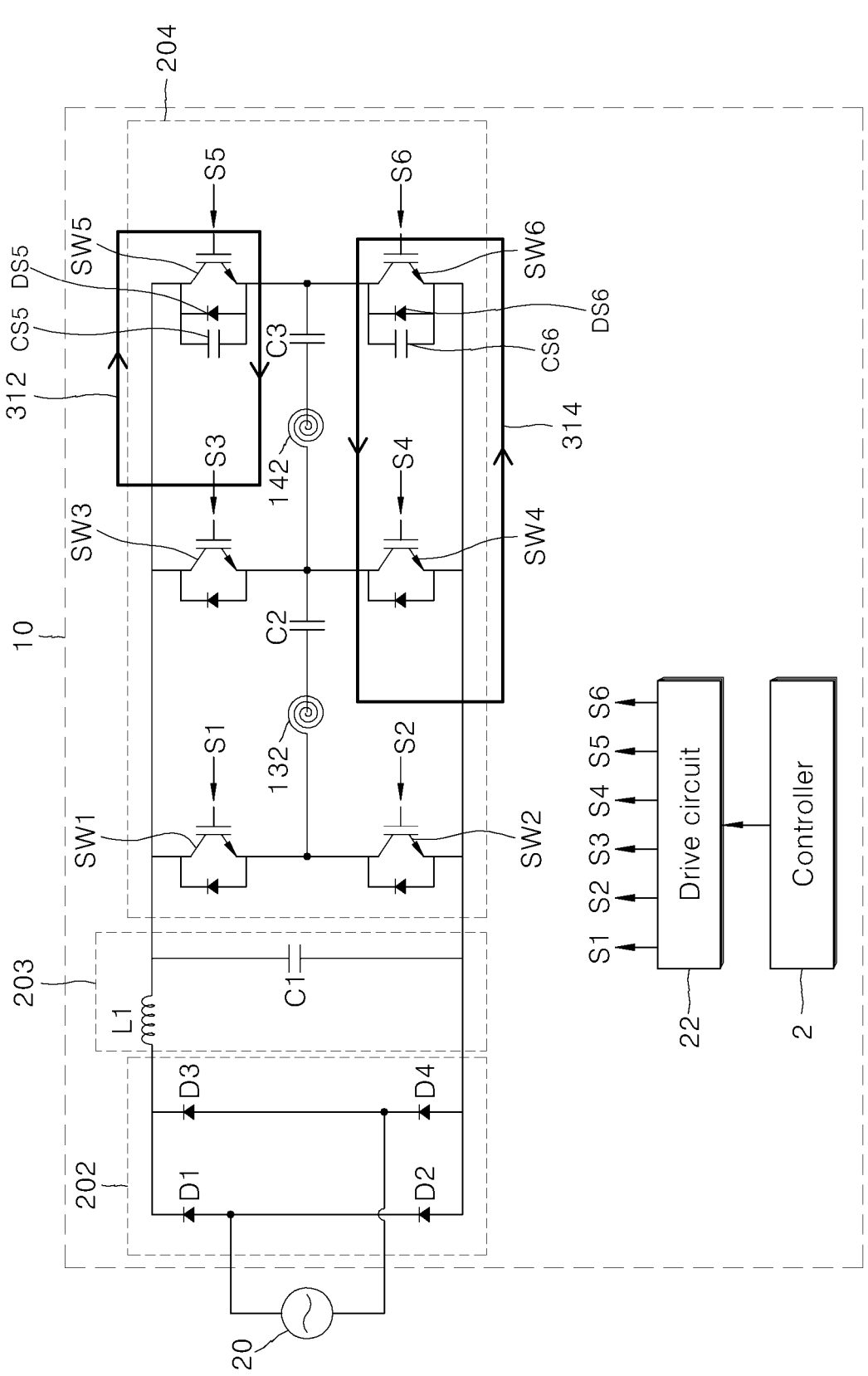

FIGS. 10 and 11 show a current path by charging or discharging snubber capacitors of the switching elements provided on a second arm circuit, when only the first working coil is driven in the full-bridge mode and the second working coil is not driven.

Each of the switching elements SW1 to SW6 provided in the inverter circuit 204 may include a diode element and a snubber capacitor. FIGS. 10 and 11 show a fifth diode DS5 and a fifth snubber capacitor CS5 provided in the fifth switching element SW5, and a sixth diode DS6 and a sixth snubber capacitor CS6 provided in the sixth switching element SW6 (out of the switching elements SW1 to SW6). Although not shown in the drawings, each of the other switching elements SW1 to SW4 may include another diode element and snubber capacitor.

As mentioned above referring to FIG. 7, if only the heating start command for the first heating region 12 is input and the required power value of the first working coil 132 exceeds the reference power value, only the first working coil 132 may be driven and the second working coil 142 may not be driven. At this time, only the first switching element SW1, the second switching element SW2, the third switching element SW3 and the fourth switching element SW4 may be turned on and turned off. The fifth switching element SW5 and the sixth switching element SW6 may be maintained in the turn-off state.

When the first working coil 132 is driven in the full-bridge mode and the second working coil 142 is not driven, the first switching element SW1 and the fourth switching element SW4 may be turned on and the second switching element SW2 and the third switching element SW3 may be turned off. At this time, a voltage may be charged in the fifth snubber capacitor CS5 and the voltage charged in the sixth snubber capacitor CS6 may be discharged. Hence, in a dead time period (DTI, see FIG. 7) in which the first switching element SW1, the second switching element SW2, the third switching element SW3 and the fourth switching element SW4 are turned off, the voltage charged in the fifth snubber capacitor CS5 may be discharged and a voltage may be charged in the sixth snubber capacitor CS6.

As shown in FIG. 10, a current path 304 may be formed by the fifth snubber capacitor CS5 and a current path 302 may be formed by the sixth snubber capacitor CS6. When the second working coil is driven through the currents may be supplied to the second working coils 142 by such current paths 302 and 304, the temperature of the second working coil 142 and the temperature of the second heating region 14 may increase.

In addition, when the first working coil 132 is driven in the full-bridge mode and the second working coil 142 is not driven, the first switching element SW1 and the fourth switching element SW4 may be turned off and the second switching element SW2 and the third switching element SW3 may be turned on. At this time, a voltage may be charged in the sixth snubber capacitor CS6 and the voltage charged in the fifth snubber capacitor CS5 may be discharged. In a dead time period (DT2, see FIG. 7) the first switching element SW1, the second switching element SW2, the third switching element SW3 and the fourth switching element SW4 may be all turned off, the voltage charged in the sixth snubber capacitor CS6 and a voltage may be charged in the fifth snubber capacitor CS5.

Accordingly, as shown in FIG. 11, the current path 312 may be formed by the fifth snubber capacitor CS5 and the current path 314 may be formed by the sixth snubber capacitor CS6. When the second working coil 142 is driven by the currents supplied to the second working coil 142 through the current paths 312 and 314, the temperature of the second working coil 142 and the temperature of the second heating region 14 may increase.

Meanwhile, although not shown in the drawing, even when only the second working coil 142 is driven in the full-bridge mode by the switching signals S1 to S6 shown in FIG. 8 and the first working coil 132 is not driven, currents may be supplied through the current paths formed by the snubber capacitor provided in the first switching element SW1 and the snubber capacitor provided in the second switching element SW2 to drive the first working coil 132. Accordingly, the temperature of the first working coil 132 and the temperature of the first heating region 12 may increase.

When one of the two working coils 132 and 142 is driven in the full-bridge mode and the other one is not driven, a phenomenon could occur in which the temperature of the other not driven working coil rises. If the temperature of the not-driven coil (i.e., the coil of which the heating start command is not input by the user) rises too high, there might be a possibility that the user may be burned or there is a risk of a secondary fire. Accordingly, it needs to lower the temperature rise rate of the working coil that is not driven when one of the two working coils 132 and 142 is driven in the full-bridge mode and the other one is not driven.

A method may be described for controlling the induction heating apparatus to lower the temperature rise rate of the working coil not driven, when one of the two working coils is driven in the full-bridge mode and the other one is not driven according to another embodiment of the present disclosure.

Figure 12:
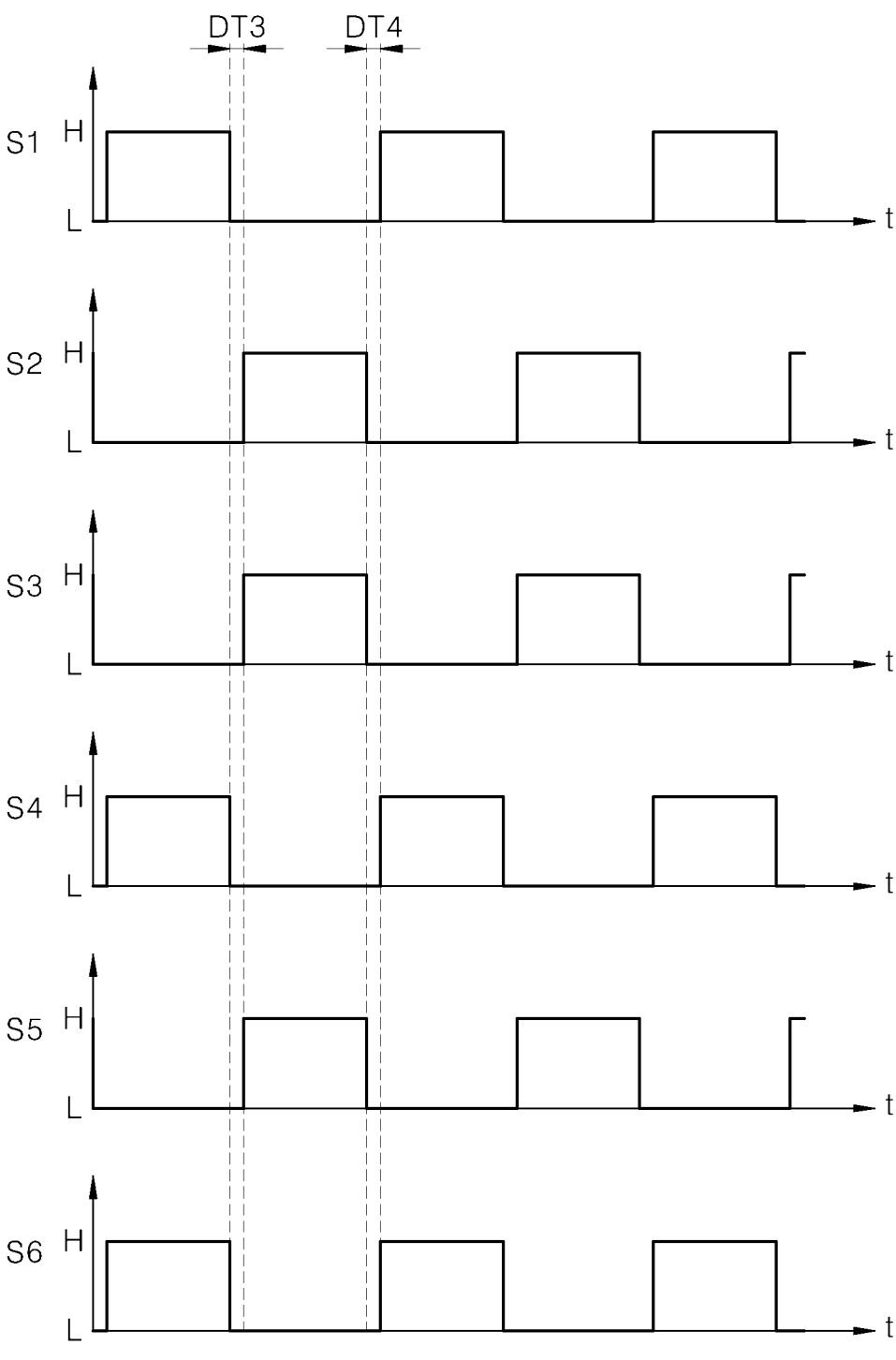
FIG. 12 shows a waveform of a switching signal input to the inverter circuit when only the first working coil is driven in the full-bridge mode according to another embodiment of the present disclosure.

FIG. 12 shows a waveform of a switching signal input to the inverter circuit when only the first working coil is driven in the full-bridge mode according to another embodiment of the present disclosure.

In this embodiment, if only the heating start command for the first heating region 12 is input and the required power value corresponding to the power level of the first heating region 12 exceeds a predetermined reference power value (e.g., 600 W), the controller 2 may determine the driving mode of the first working coil 132 into the full-bridge mode. Accordingly, the controller 2 may supply a control signal to the driving circuit 22 so that the switching signals S1, S2, S3, S4, S5 and S6 having the waveforms shown in FIG. 12 may be output.

Referring to FIG. 12, when the driving mode of the first working coil 132 is the full-bridge mode, the first switching element SW1 may be alternately turned on and off with the second switching element SW2, and the third switching element SW3 may be alternately turned on and off with the fourth switching element SW4. The first switching element SW1 and the fourth switching element SW4 may be turned on and turned off at the same timing. The second switching element SW2 and the third switching element SW3 may be turned on and turned off at the same timing.

As shown in FIG. 12, the fifth switching element SW5 may be alternately turned on and turned off with the sixth switching element SW6. At this time, the fifth switching element SW5 and the third switching element SW3 may be turned on and off at the same timing, and the sixth switching element SW6 and the fourth switching element SW4 may be turned on and off at the same timing. Accordingly, only the first working coil 132 may be driven in the half-bridge mode while the second working coil 142 is not driven.

Figure 13:
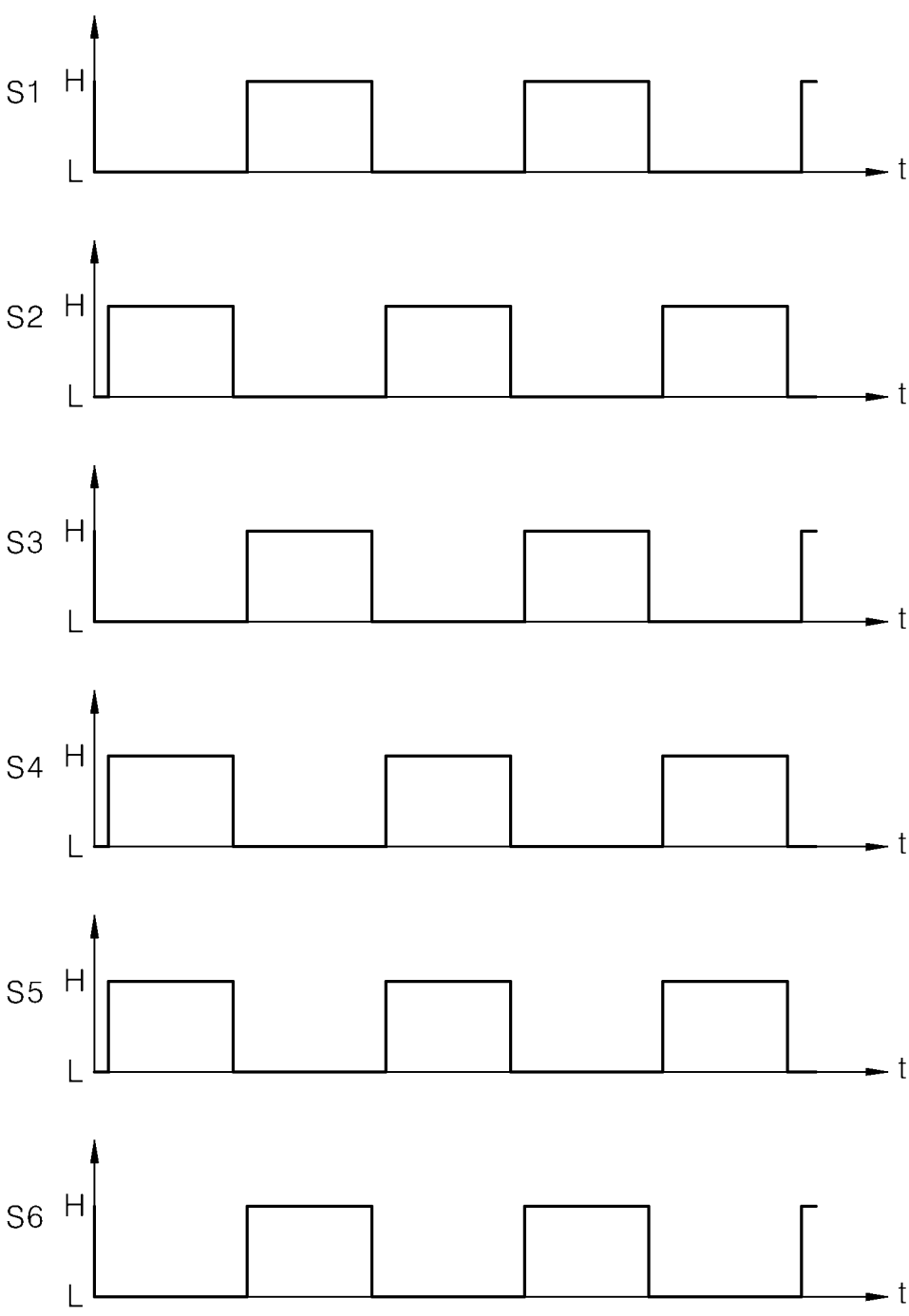
FIG. 13 shows a waveform of a switching signal input to the inverter circuit when only the second working coil is driven in the full-bridge mode according to the FIG. 12 embodiment.

FIG. 13 shows a waveform of a switching signal input to the inverter circuit when only the second working coil is driven in the full-bridge mode according to the embodiment of FIG. 12.

If only the heating start command for the second heating region 14 is input and the required power value corresponding to the power level of the first heating region 12 exceeds a predetermined reference power value (e.g., 600 W), the controller 2 may determine the driving mode of the second working coil 142 to be the full-bridge mode. Accordingly, the controller 2 may supply a control signal to the driving circuit 22 so that the switching signals S1, S2, S3, S4, S5 and S6 having the waveforms shown in FIG. 13 may be output.

Referring to FIG. 13, when the driving mode of the second working coil 142 is the full-bridge mode, the fifth switching element SW5 may be alternately turned on and off with the sixth switching element SW6, and the third switching element SW3 may be alternately turned on and off with the fourth switching element SW4. The third switching element SW3 and the sixth switching element SW6 may be turned on and turned off at the same timing. The fourth switching element SW4 and the fifth switching element SW5 may be turned on and turned off at the same timing.

In addition, as shown in FIG. 13, the first switching element SW1 may alternately turned on and turned off with the second switching element SW2. At this time, the first switching element SW1 and the third switching element SW3 may be turned on and off at the same timing. The second switching element SW2 and the fourth switching element SW4 may be turned on and off at the same timing. Accordingly, only the second working coil 142 may be driven in the full-bridge mode while the first working coil 132 is not driven.

As described referring to FIG. 12, the controller 2 according to this embodiment may control the switching elements provided in the second arm circuit (i.e., the fifth switching element SW5 and the sixth switching element SW6) to be turned on and turned off when the first working coil 132 is driven in the full-bridge mode and the second working coil 142 is not driven. In other words, when the first working coil 132 is driven in the full-bridge mode and the second working coil 142 is not driven, the switching elements provided in the second arm circuit (i.e., the fifth switching element SW5 and the sixth switching element SW6) may be turned on and turned off at the same timing as the switching elements provided in the shared arm circuit (i.e., the third switching element SW3 and the fourth switching element SW4).

As described referring to FIG. 13, the controller 2 according to this embodiment may control the switching elements provided in the first arm circuit (i.e., the first switching element SW1 and the second switching element SW2) to be turned on and turned off when the second working coil 142 is driven in the full-bridge mode and the first working coil 132 is not driven. In other words, when the second working coil 132 is driven in the full-bridge mode and the first working coil 132 is not driven, the switching elements provided in the first arm circuit (i.e., the first switching element SW1 and the second switching element SW2) may be turned on and turned off at the same timing as the switching elements provided in the shared arm circuit (i.e., the third switching element SW3 and the fourth switching element SW4).

Figure 14:
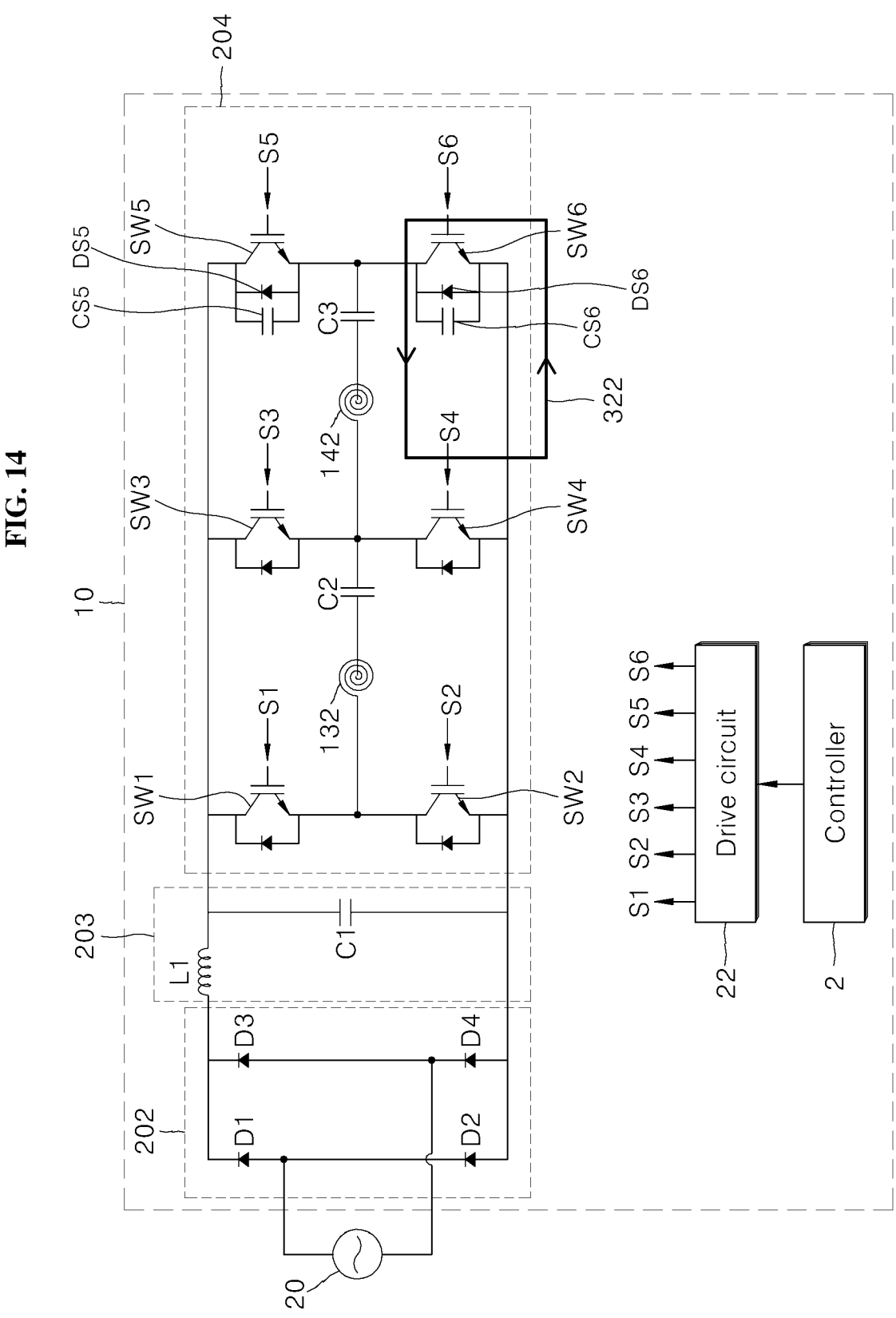
Figure 15:
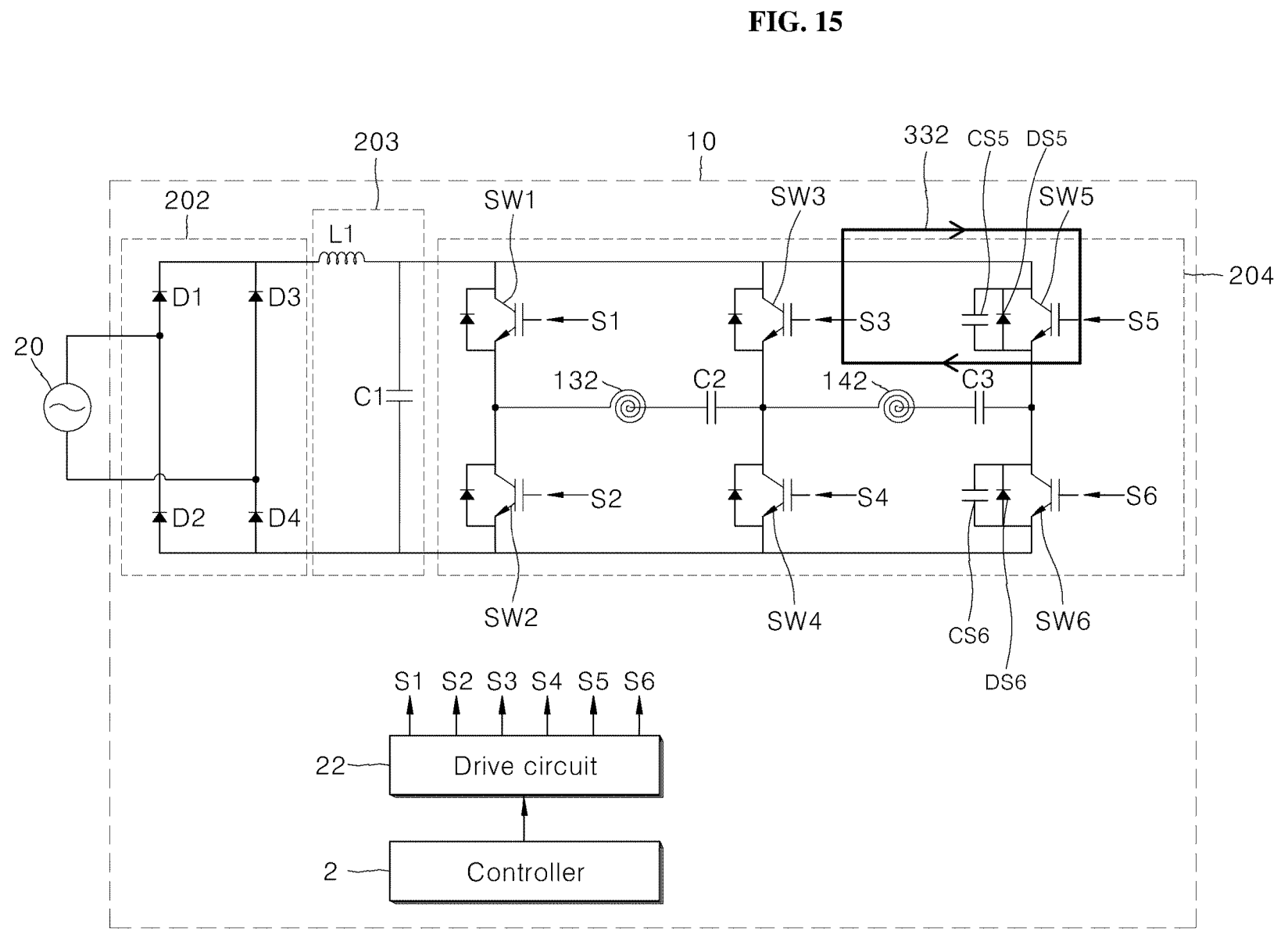

FIGS. 14 and 15 show a current path by charging or discharging snubber capacitors of the switching elements provided a second arm circuit, when only the first working coil is driven in the full-bridge mode and the second working coil is not driven according to the embodiment of FIG. 12.

As described referring to FIG. 12, when the first working coil 132 is driven in the full-bridge mode and the second working coil 142 is not driven, the fifth switching element SW5 and the sixth switching element SW6 may be turned on and turned off at the same timing as the third switching element SW3 and the fourth switching element SW4 according to this embodiment.

Accordingly, when the first switching element SW1, the fourth switching element SW4 and the sixth switching element SW6 are turned on and the second switching element SW2, the third switching element SW3 and the fifth switching element SW5 are turned off, a voltage may be charged in the sixth snubber capacitor CS6. After that, in a dead time period (DT3, see FIG. 12) in which all of the switching elements SW1 to SW6 are turned off, the voltage charged in the sixth snubber capacitor CS6 may be discharged.

Accordingly, a current path 322 shown in FIG. 14 may be formed by the sixth snubber capacitor CS6. When the second working coil is driven by supplying currents to the second working coil 142 through the current path 322, the temperature of the second working coil 142 and the temperature of the second heating region 14 may rise. However, compared with the FIG. 10 embodiment, the current path 304 formed by the fifth switching element SW5 may not be formed so that the magnitude of the current supplied to the second working coil 142 may be reduced. Accordingly, compared with the FIG. 10 embodiment, the temperature increase rate of the second working 142 may be lowered.

In this embodiment of the present disclosure, when first working coil 132 is driven in the full-bridge mode and the second working coil 142 is not driven, the first switching element SW1, the fourth switching element SW4 and the sixth switching element SW6 may be turned off and the second switching element SW2, the third switching element SW3 and the fifth switching element SW5 may be turned on. At this time, a voltage may be charged in the fifth snubber capacitor CS5. In the dead time period (DT4, see FIG. 12)

in which all of the switching elements SW1 to SW6 are turned off, the voltage charged in the fifth snubber capacitor CS5 may be discharged.

Accordingly, a current path 332 shown in FIG. 15 may be formed by the fifth snubber capacitor CS5. When the second working coil 142 is driven by supplying currents to the second working coil 142 through the current path 332, the temperature of the second working coil 132 and the temperature of the second heating region 14 may increase. However, compared with the FIG. 11 embodiment, the current path 314 may not be formed by the sixth switching element SW6 so that the magnitude of the current supplied to the second working coil 142 may be reduced. Accordingly, compared with the FIG. 11 embodiment, the temperature increase rate of the second working coil 142 may be lowered.

Meanwhile, even when only the second working coil 142 is driven in the full-bridge mode by the switching signals S1 to S6 shown in FIG. 13 and the first working coil 132 is not driven, currents may be supplied through the current paths formed by the snubber capacitor provided in the first switching element SW1 and the snubber capacitor provided in the second switching element SW2 to drive the first working coil 132. Accordingly, the temperature of the first working coil 132 and the temperature of the first heating region 12 may increase.

According to this embodiment, when one of the two working coils 132 and 142 is driven in the full-bridge mode and the other one of the working coils is not driven, the temperature increase rate of the not-driven working coil may be lowered. Therefore, the possibility that the user is burned or there is the rise of a secondary fire may be reduced.

Figure 16:
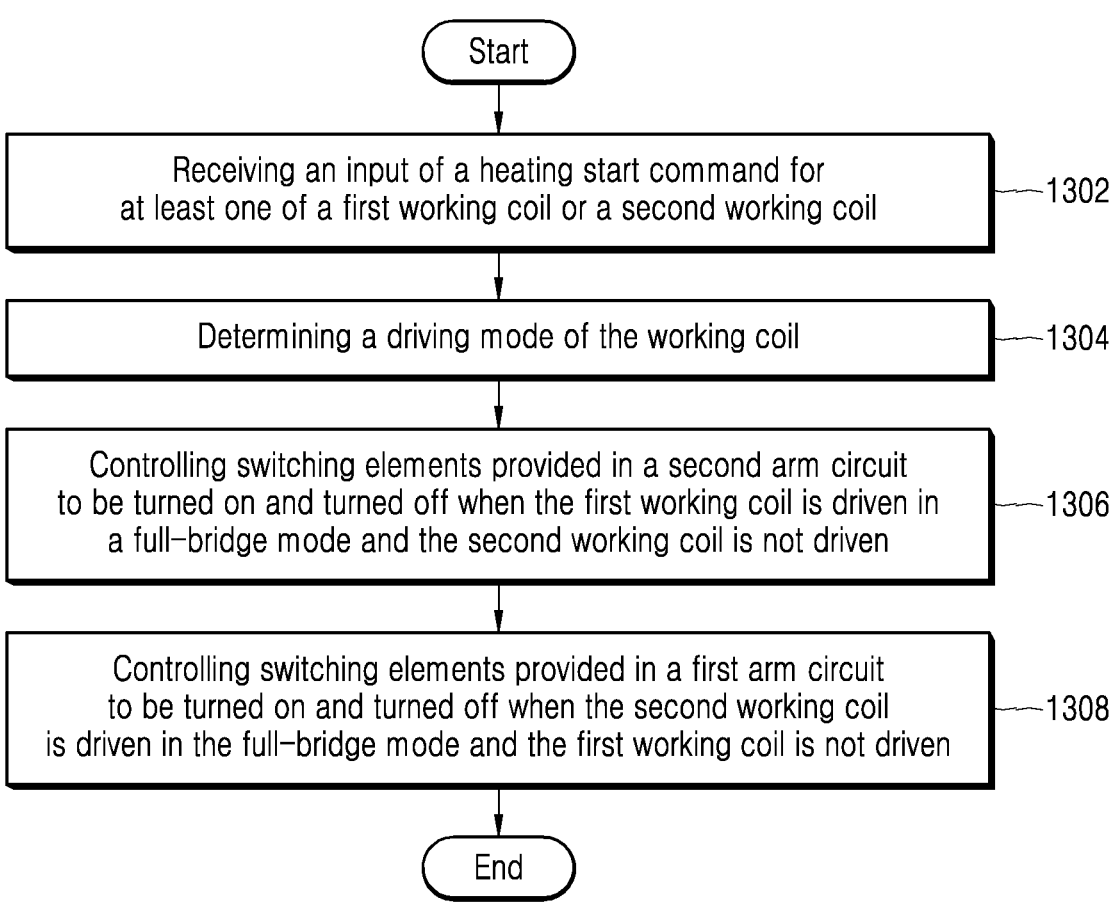
FIG. 16 is a flow chart of a method for controlling the induction heating apparatus according to one embodiment.

FIG. 16 is a flow chart of a method for controlling the induction heating apparatus according to one embodiment. The controller 2 of the induction heating apparatus 1 according to one embodiment may receive an input of the heating start command for at least one of the first working coil 132 or the second working coil 142 (operation 1302). As one example, the controller 2 may receive only the input of the heating start command for the first working coil 132 or only the input of the heating start command for the second working coil 142. As another example, the controller 2 may receive an input of the heating start command for the first working coil 132 and an input of the heating start command for the second working coil 142.

Once receiving the input of the heating start command, the controller 2 may determine the driving mode of each working coil (operation 1304). The determining the driving mode of the working coils (operation 1304) may include determining the driving mode of the working coil to be the half-bridge mode when the required power value of the working coil is equal to or less than a preset reference power value; and determining the driving mode of the working coil to be the full-bridge mode when the required power value of the working coil exceeds the reference power value.

Hence, the controller 2 may control the switching elements provided in the second arm circuit to be turned on and turned off when the first working coil 132 is driven in the full-bridge mode and the second working coil 142 is not driven (operation 1306). In one embodiment of the present disclosure, when the first coil 132 is driven in the full-bridge mode and the second working coil 142 is not driven, the switching elements provided in the second arm circuit (i.e., the fifth switching element SW5 and the sixth switching element SW6) may be turned on and turned off at the same timing as the switching elements provided in the shared arm circuit (i.e., the third switching element SW3 and the fourth switching element SW4).

The controller 2 may control the switching elements provided in the first arm circuit to be turned on and turned off when the second working coil 142 is driven in the full-bridge mode and the first working coil 132 is not driven (operation 1308). In one embodiment of the present disclosure, when the second working coil 142 is driven in the full-bridge mode and the first working coil 132 is not driven, the switching elements provided in the first arm circuit (i.e., the first switching element SW1 and the second switching element SW2) may be turned on and turned off at the same timing as the switching elements provided in the shared arm circuit (i.e., the third switching element SW3 and the fourth switching element SW4).

Figure 17:
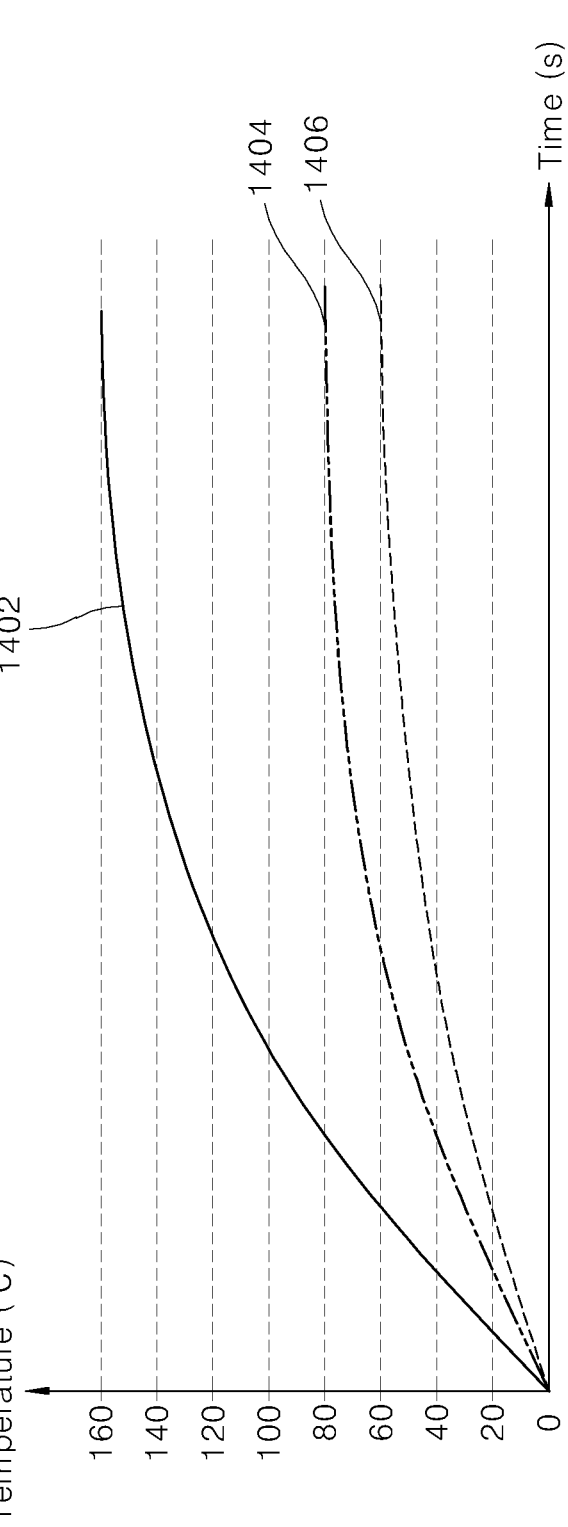
FIG. 17 is a graph showing the temperature change of the first heating region and the temperature change of the second heating region, when the first working coil is driven in the full-bridge mode and the second working coil is not driven.

FIG. 17 is a graph showing the temperature change of the first heating region and the temperature change of the second heating region, when the first working coil is driven in the full-bridge mode and the second working coil is not driven.

FIG. 17 shows a curve 1402 indicating a change in the temperature of the first working coil 132.

In case the first working coil 132 is driven in the full-bridge mode and the second working coil 142 is not driven, FIG. 17 shows a curve 1404 indicating a change in the temperature of the second working coil 142 while the switching signals S1 to S6 shown in FIG. 7 are supplied to the inverter circuit 204 and a curve 1406 indicating a change in the temperature of the second working coil 142 while the switching signals S1 to S6 shown in FIG. 12 are supplied to the inverter circuit 204.

As shown in FIG. 17, not only the temperature of the first working coil 132 but also the temperature of the second working coil 142 may increase when the first working coil 132 is driven in the full-bridge mode and the second working coil 142 is not driven.

However, compared with the case in which the switching signals S1 to S6 shown in FIG. 7 are supplied to the inverter circuit 204, in the case in which the switching signals S1 to S6 shown in FIG. 12 are supplied to the inverter circuit 204, the temperature increase rate of the second working coil 142 is shown to be lowered more. Accordingly, the possibility that the user is burned or the rise of the secondary fire occurs in the driving process of the induction heating apparatus 1 may be reduced.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

An object of the present disclosure is to provide an induction heating apparatus and a method for controlling the induction heating apparatus that may be variably driven in a half-bridge mode or a full-bridge mode based on a required power value, while including a smaller number of switching elements than disadvantageous arrangements.

An object of the present disclosure is to provide an induction heating apparatus and a method for controlling the induction heating apparatus in which when only one of the two working coils is driven, the temperature increase rate of the remaining working coils that are not driven is reduced.

Aspects according to the present disclosure are not limited to the above ones, and other aspects and advantages that are not mentioned above can be clearly understood from the following description and can be more clearly understood from the embodiments set forth herein.

An induction heating apparatus according to one embodiment of the present disclosure may include a first working coil provided in a position corresponding to a first heating region; a second working coil provided in a position corresponding to a second heating region; an inverter circuit configured to supply current for driving at least one of the first working coil or the second working coil and comprising a plurality of switching elements; a drive circuit configured to supply a switching signal to each of the switching elements; and a controller configured to determine a driving mode of the working coil when a heating start command for at least one of the first working coil or the second working coil is input, and supply a control signal for outputting of the switching signal to the drive circuit based on the determined driving mode.

The inverter circuit may include a first arm circuit connected to the first working coil; a second arm circuit connected to the second working coil; and a shared arm circuit connected to the first working coil and the second working coil.

The controller may control switching elements provided in the second arm circuit to be turned on and turned off when the first working coil is driven in a full-bridge mode and the second working coil is not driven, and control switching elements provided in the first arm circuit to be turned on and turned off when the second working coil is driven in the full-bridge mode and the first working coil is not driven.

The switching elements provided in the second arm circuit may be turned on and turned off at the same timing as switching elements provided in the shared arm circuit when the first working coil is driven in the full-bridge mode and the second working coil is not driven, and the switching elements provided in the first arm circuit may be turned on and turned off at the same timing as the switching elements provided in the shared arm circuit when the second working coil is driven in the full-bridge mode and the first working coil is not driven.

The first arm circuit may include a first switching element and a second switching element that are connected in series with each other. The shared arm circuit may include a third switching element and a fourth switching element that are connected in series with each other and in parallel with the first switching element and the second switching element. The second arm circuit may include a fifth switching element and a sixth switching element that are connected in series with each other and in parallel with the third switching element and the fourth switching element.

The first working coil may be connected between a connection point between the first switching element and the second switching element and a connection point between the third switching element and the fourth switching element, and the second working coil may be connected between a connection point between the third switching element and the fourth switching element and a connection point between the fifth switching element and the sixth switching element.

When the first working coil is driven in the full-bridge mode, the first switching element and the fourth switching element may be alternately turned on and turned off with the second switching element and the third switching element. When the second working coil is driven in the full-bridge mode, the third switching element and the sixth switching element may be alternately turned on and turned off with the fourth switching element and the fifth switching element.

When the first working coil is driven in the full-bridge mode and the second working coil is not driven, the first switching element, the fourth switching element and the sixth switching element may be alternately turned on and turned off with the second switching element, the third switching element and the fifth switching element. When the second working coil is driven in the full-bridge mode and the first working coil is not driven, the first switching element, the third switching element and the sixth switching element may be alternately turned on and turned off with the second switching element, the fourth switching element and the fifth switching element.

When the first working coil is driven in a half-bridge mode, the first switching element may be alternately turned on and turned off with the second switching element and the fourth switching element is maintained in a turned-on state. When the second working coil is driven in the half-bridge mode, the fifth switching element may be alternately turned on and turned off with the sixth switching element and the fourth switching element is maintained in the turned-on state.

The controller may determine the driving mode of the working coil to be a half-bridge mode when the required power value is equal to and less than a predetermined reference value. The controller may determine the driving mode of the working coil to be a full-bridge mode when the required power value is more than the reference power value.

A method for controlling an induction heating apparatus according to one embodiment of the present disclosure may include steps of receiving an input of a heating start command for at least one of a first working coil or a second working coil; determining a driving mode of the working coil; controlling switching elements provided in a second arm circuit to be turned on and turned off when the first working coil is driven in a full-bridge mode and the second working coil is not driven; and controlling switching elements provided in a first arm circuit to be turned on and turned off when the second working coil is driven in the full-bridge mode and the first working coil is not driven.

When the first working coil is driven in the full-bridge mode and the second working coil is not driven, the switching elements provided in the second arm circuit may be turned on and turned off at the same timing as switching elements provided in a shared arm circuit. When the second working coil is driven in the full-bridge mode and the first working coil is not driven, the switching elements provided in the first arm circuit may be turned on and turned off at the same timing as the switching elements provided in the shared arm circuit.

The induction heating apparatus may include an inverter circuit configured to supply current for driving at least one of the first working coil or the second working coil and comprising a plurality of switching elements.

The inverter circuit may include a first arm circuit connected to the first working coil; a second arm circuit connected to the second working coil; and a shared arm circuit connected to the first working coil and the second working coil.

The first arm circuit may include a first switching element and a second switching element that are connected in series with each other, and the shared arm circuit may include a third switching element and a fourth switching element that are connected in series with each other and in parallel with the first switching element and the second switching element.

The second arm circuit may include a fifth switching element and a sixth switching element that are connected in series with each other and in parallel with the third switching element and the fourth switching element. The first working coil may be connected between a connection point between the first switching element and the second switching element and a connection point between the third switching element and the fourth switching element. The second working coil may be connected between a connection point between the third switching element and the fourth switching element and a connection point between the fifth switching element and the sixth switching element.

When the first working coil is driven in the full-bridge mode, the first switching element and the fourth switching element may be alternately turned on and turned off with the second switching element and the third switching element. When the second working coil is driven in the full-bridge mode, the third switching element and the sixth switching element may be alternately turned on and turned off with the fourth switching element and the fifth switching element.

When the first working coil is driven in the full-bridge mode and the second working coil is not driven, the first switching element, the fourth switching element and the sixth switching element may be alternately turned on and turned off with the second switching element, the third switching element and the fifth switching element. When the second working coil is driven in the full-bridge mode and the first working coil is not driven, the first switching element, the third switching element and the sixth switching element may be alternately turned on and turned off with the second switching element, the fourth switching element and the fifth switching element.

When the first working coil is driven in a half-bridge mode, the first switching element may be alternately turned on and turned off with the second switching element and the fourth switching element is maintained in a turned-on state. When the second working coil is driven in the half-bridge mode, the fifth switching element may be alternately turned on and turned off with the sixth switching element and the fourth switching element is maintained in the turned-on state.

The controller may determine the driving mode of the working coil to be a half-bridge mode when the required power value is equal to and less than a predetermined reference value. The controller may determine the driving mode of the working coil to be a full-bridge mode when the required power value is more than the reference power value.

According to the embodiments of the present disclosure, the induction heating apparatus may be variably driven in a half-bridge mode or a full-bridge mode based on a required power value, while including a smaller number of switching elements than disadvantageous arrangements.

According to the embodiments of the present disclosure, when only one of the two working coils is driven, the temperature increase rate of the remaining working coils that are not driven is reduced.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An induction heating apparatus comprising:
a first working coil disposed to correspond to a first heating region;
a second working coil disposed to correspond to a second heating region;
an inverter circuit configured to provide current for driving at least one of the first working coil or the second working coil, and the inverter circuit including a plurality of switching elements;
a drive circuit configured to provide a switching signal to each of the switching elements; and
a controller configured to:
determine a driving mode in response to receiving a heating start command for at least one of the first working coil or the second working coil, and
provide a control signal to the drive circuit for outputting the switching signal based on the driving mode,
wherein the inverter circuit includes:
a first arm circuit coupled to the first working coil;
a second arm circuit coupled to the second working coil; and
a shared arm circuit coupled to the first working coil and to the second working coil,
wherein the controller is configured to:
control switching elements of the second arm circuit to be turned on and turned off when the first working coil is driven in a full-bridge mode and the second working coil is not to be driven,
control switching elements of the first arm circuit to be turned on and turned off when the second working coil is driven in the full-bridge mode and the first working coil is not to be driven,
determine that the driving mode is to be a half-bridge mode when a required power value is equal to and less than a predetermined reference value, and
determine that the driving mode is to be the full-bridge mode when the required power value is more than the predetermined reference value, and
wherein when heating start commands for both the first working coil and the second working coil are received, switching elements included in the first arm circuit are alternately turned on and off within same switching cycles and switching elements included in the second arm circuit are alternately turned on and off within same switching cycles to concurrently drive both the first working coil and the second working coil.

2. The induction heating apparatus of claim 1, wherein the switching elements of the second arm circuit are turned on and turned off at the same timing as switching elements of the shared arm circuit when the first working coil is driven in the full-bridge mode and the second working coil is not driven, and
the switching elements of the first arm circuit are turned on and turned off at the same timing as the switching elements of the shared arm circuit when the second working coil is driven in the full-bridge mode and the first working coil is not driven.

3. The induction heating apparatus of claim 1, wherein the first arm circuit includes a first switching element and a second switching element connected in series, the shared arm circuit includes a third switching element and a fourth switching element connected in series, and connected in parallel with the first switching element and the second switching element, the second arm circuit includes a fifth switching element and a sixth switching element connected in series, and connected in parallel with the third switching element and the fourth switching element, the first working coil is connected to a connection point between the first switching element and the second switching element and to a connection point between the third switching element and the fourth switching element, and the second working coil is connected to the connection point between the third switching element and the fourth switching element and to a connection point between the fifth switching element and the sixth switching element.

4. The induction heating apparatus of claim 3, wherein when the first working coil is driven in the full-bridge mode, the first switching element and the fourth switching element are alternately turned on and turned off with the second switching element and the third switching element, and when the second working coil is driven in the full-bridge mode, the third switching element and the sixth switching element are alternately turned on and turned off with the fourth switching element and the fifth switching element.

5. The induction heating apparatus of claim 3, wherein when the first working coil is driven in the full-bridge mode and the second working coil is not driven, the first switching element, the fourth switching element and the sixth switching element are alternately turned on and turned off with the second switching element, the third switching element and the fifth switching element, and when the second working coil is driven in the full-bridge mode and the first working coil is not driven, the first switching element, the third switching element and the sixth switching element are alternately turned on and turned off with the second switching element, the fourth switching element and the fifth switching element.

6. The induction heating apparatus of claim 3, wherein when the first working coil is driven in the half-bridge mode, the first switching element is alternately turned on and turned off with the second switching element, and the fourth switching element is maintained in a turned-on state, and when the second working coil is driven in the half-bridge mode, the fifth switching element is alternately turned on and turned off with the sixth switching element, and the fourth switching element is maintained in the turned-on state.

7. A method for controlling an induction heating apparatus that includes an inverter circuit having a plurality of switching elements to provide current to a first working coil and a second working coil, the plurality of switching elements arranged to include a first arm circuit, a second arm circuit and a shared arm circuit, the method comprising:
receiving a heating start command for at least one of the first working coil or the second working coil;

determining a driving mode of at least one of the first working coil or the second working coil;
controlling switching elements of the second arm circuit to be turned on and turned off when the driving mode of the first working coil is a full-bridge mode and the second working coil is determined to not be driven; and
controlling switching elements of the first arm circuit to be turned on and turned off when the driving mode of the second working coil is the full-bridge mode and the first working coil is determined to not be driven,
wherein the driving mode is determined to be a half-bridge mode when a required power value is equal to and less than a predetermined reference value,
wherein the driving mode is determined to be the full-bridge mode when the required power value is more than the predetermined reference value, and
wherein when heating start commands for both the first working coil and the second working coil are received, switching elements included in the first arm circuit are alternately turned on and off within same switching cycles and switching elements included in the second arm circuit are alternately turned on and off within same switching cycles to concurrently drive both the first working coil and the second working coil.

8. The method of claim 7, wherein
when the first working coil is determined to be driven in the full-bridge mode and the second working coil is not to be driven, the switching elements of the second arm circuit are turned on and turned off at the same timing as switching elements of the shared arm circuit, and
when the second working coil is determined to be driven in the full-bridge mode and the first working coil is not to be driven, the switching elements of the first arm circuit are turned on and turned off at the same timing as the switching elements of the shared arm circuit.

9. The method of claim 7, wherein
the first arm circuit is coupled to the first working coil;
the second arm circuit is coupled to the second working coil; and
the shared arm circuit is coupled to the first working coil and to the second working coil, and
the first arm circuit includes a first switching element and a second switching element connected in series,
the shared arm circuit includes a third switching element and a fourth switching element connected in series, and connected in parallel with the first switching element and the second switching element,
the second arm circuit includes a fifth switching element and a sixth switching element connected in series, and connected in parallel with the third switching element and the fourth switching element,
the first working coil is connected to a connection point between the first switching element and the second switching element and to a connection point between the third switching element and the fourth switching element, and
the second working coil is connected to the connection point between the third switching element and the fourth switching element and to a connection point between the fifth switching element and the sixth switching element.

10. The method of claim 9, wherein
when the first working coil is determined to be driven in the full-bridge mode, the first switching element and the fourth switching element are alternately turned on and turned off with the second switching element and the third switching element, and when the second working coil is determined to be driven in the full-bridge mode, the third switching element and the sixth switching element are alternately turned on and turned off with the fourth switching element and the fifth switching element.

11. The method of claim 9, wherein when the first working coil is determined to be driven in the full-bridge mode and the second working coil is not to be driven, the first switching element, the fourth switching element and the sixth switching element are alternately turned on and turned off with the second switching element, the third switching element and the fifth switching element, and when the second working coil is determined to be driven in the full-bridge mode and the first working coil is not to be driven, the first switching element, the third switching element and the sixth switching element are alternately turned on and turned off with the second switching element, the fourth switching element and the fifth switching element.

12. The method of claim 9, wherein when the first working coil is determined to be driven in the half-bridge mode, the first switching element is alternately turned on and turned off with the second switching element, and the fourth switching element is maintained in a turned-on state, and when the second working coil is determined to be driven in the half-bridge mode, the fifth switching element is alternately turned on and turned off with the sixth switching element, and the fourth switching element is maintained in the turned-on state.

13. An induction heating apparatus comprising:

a first working coil disposed to correspond to a first heating region;

a second working coil disposed to corresponding to a second heating region;

an inverter circuit configured to supply current for driving at least one of the first working coil or the second working coil, and the inverter circuit including a plurality of switching elements;

wherein the inverter circuit includes:

a first arm circuit coupled to the first working coil;

a second arm circuit coupled to the second working coil; and a shared arm circuit coupled to the first working coil and to the second working coil; and a controller configured to:

control switching elements of the second arm circuit to be turned on and turned off when the first working coil is determined to be driven in a full-bridge mode and the second working coil is not to be driven, control switching elements of the first arm circuit to be turned on and turned off when the second working coil is determined to be driven in the full-bridge mode and the first working coil is not to be driven, determine that the driving mode is to be a half-bridge mode when a required power value is equal to and less than a predetermined reference value, and determine that the driving mode is to be the full-bridge mode when the required power value is more than the predetermined reference value, wherein when heating start commands for both the first working coil and the second working coil are received, switching elements included in the first arm circuit are alternately turned on and off within same switching cycles and switching elements included in the second arm circuit are alternately turned on and off within same switching cycles to concurrently drive both the first working coil and the second working coil.

14. The induction heating apparatus of claim 13, wherein the switching elements of the second arm circuit are turned on and turned off at the same timing as switching elements of the shared arm circuit when the first working coil is determined to be driven in the full-bridge mode and the second working coil is not to be driven, and the switching elements of the first arm circuit are turned on and turned off at the same timing as the switching elements of the shared arm circuit when the second working coil is determined to be driven in the full-bridge mode and the first working coil is not to be driven.

15. The induction heating apparatus of claim 13, wherein the first arm circuit includes a first switching element and a second switching element connected in series, the shared arm circuit includes a third switching element and a fourth switching element connected in series, and connected in parallel with the first switching element and the second switching element, the second arm circuit includes a fifth switching element and a sixth switching element connected in series, and connected in parallel with the third switching element and the fourth switching element, the first working coil is connected to a connection point between the first switching element and the second switching element and to a connection point between the third switching element and the fourth switching element, and the second working coil is connected to the connection point between the third switching element and the fourth switching element and to a connection point between the fifth switching element and the sixth switching element.

16. The induction heating apparatus of claim 15, wherein when the first working coil is driven in the full-bridge mode, the first switching element and the fourth switching element are alternately turned on and turned off with the second switching element and the third switching element, and when the second working coil is driven in the full-bridge mode, the third switching element and the sixth switching element are alternately turned on and turned off with the fourth switching element and the fifth switching element.

17. The induction heating apparatus of claim 15, wherein when the first working coil is driven in the full-bridge mode and the second working coil is not to be driven, the first switching element, the fourth switching element and the sixth switching element are alternately turned on and turned off with the second switching element, the third switching element and the fifth switching element, and when the second working coil is driven in the full-bridge mode and the first working coil is not to be driven, the first switching element, the third switching element and the sixth switching element are alternately turned on and turned off with the second switching element, the fourth switching element and the fifth switching element.

18. The induction heating apparatus of claim 15, wherein when the first working coil is driven in the half-bridge mode, the first switching element is alternately turned on and turned off with the second switching element, and the fourth switching element is maintained in a turned-on state, and when the second working coil is driven in the half-bridge mode, the fifth switching element is alternately turned on and turned off with the sixth switching element, and the fourth switching element is maintained in the turned-on state.

* * * * *